(12) United States Patent
Hane et al.

(10) Patent No.: US 6,421,477 B1
(45) Date of Patent: Jul. 16, 2002

(54) OPTICAL SWITCH

(75) Inventors: Kazuhiro Hane, Sendai; Toshiyuki Kasajima; Keiichi Hara, both of Chiisagata-gun, all of (JP)

(73) Assignee: Mimaki Electronic Component Co., Ltd., Nagano (JP)

( * ) Notice: Subject to any disclaimer, the term of this patent is extended or adjusted under 35 U.S.C. 154(b) by 0 days.

(21) Appl. No.: 09/523,459

(22) Filed: Mar. 10, 2000

Related U.S. Application Data

(63) Continuation of application No. PCT/JP99/03764, filed on Jul. 13, 1999.

(30) Foreign Application Priority Data

| Jul. 13, 1998 | (JP) | 10-197602 |
| Jun. 4, 1999 | (JP) | 11-158302 |
| Jun. 4, 1999 | (JP) | 11-158384 |

(51) Int. Cl.[7] ................................................ G02B 6/35
(52) U.S. Cl. ........................................... 385/21; 385/16
(58) Field of Search ........................ 385/16–25; 359/127, 359/128

(56) References Cited

U.S. PATENT DOCUMENTS 4,223,978 A * 9/1980 Kummer et al.

FOREIGN PATENT DOCUMENTS

| JP | 3-68910 | 3/1991 |
| JP | 3-75610 | 3/1991 |
| JP | 03-068910 A * | 3/1991 |
| JP | 03-075610 A * | 3/1991 |
| JP | 6-208064 | 7/1994 |
| JP | 06-265799 A * | 9/1994 |
| JP | 6-265799 | 9/1994 |
| JP | 6-273680 | 9/1994 |
| JP | 7-5383 | 1/1995 |
| JP | 7-92401 | 4/1995 |
| JP | 07-092401 A * | 4/1995 |
| JP | 7-270692 | 10/1995 |
| JP | 07-270692 A * | 10/1995 |
| JP | 8-20618 | 3/1996 |
| JP | 08-020618 A * | 3/1996 |
| JP | 08-220456 A * | 8/1996 |
| JP | 8-220456 | 8/1996 |
| JP | 10-161046 A * | 6/1998 |
| JP | 10-161046 | 6/1998 |

* cited by examiner

*Primary Examiner*—Akm E. Ullah
*Assistant Examiner*—Michelle R. Connelly-Cushwa
(74) *Attorney, Agent, or Firm*—Pillsbury Winthrop LLP

(57) ABSTRACT

To make an optical switch smaller, two frames are formed by etching in such manner that when they are stuck together to form a support member, an hexagonal opening appears. The end portions of a pair of fixed optical fibers are arranged in the bottom portions of a pair of opposing V-grooves provided in this hexagonal opening. A pair of movable optical fibers are fixed at the other end of the support member, and these movable optical fibers are arranged in such manner that their end faces are contiguous with the end faces of the pair of fixed optical fibers. A drive mechanism causes the end portions of this pair of vertically arranged movable optical fibers to move to the left or the right, come into contact with the walls of respective V-grooves, slide into the bottoms of the grooves, and thereby have their cores aligned with the cores of the fixed optical fibers. Alternatively, two parallel beams formed from silicon are formed on the inside of a single frame, a pair of mutually opposing projections are formed in approximately the middle portions of these beams, and the end portions of a pair of optical fibers are arranged in and in contact with V-grooves formed parallel to and on the opposing faces of this pair of projections.

13 Claims, 25 Drawing Sheets

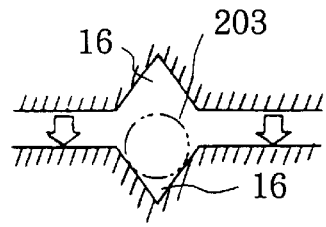
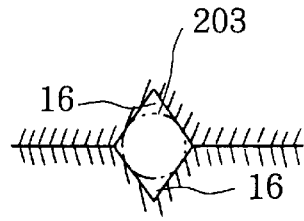
FIG.7  FIG.8
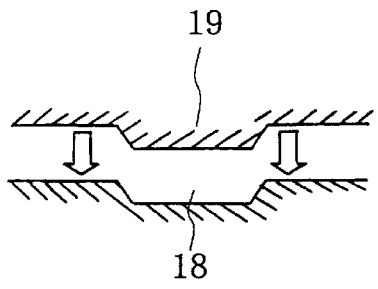
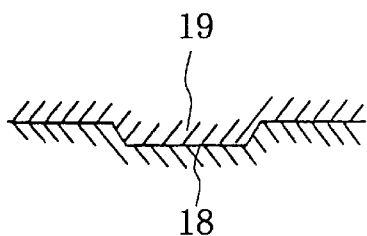
FIG.9  FIG.10
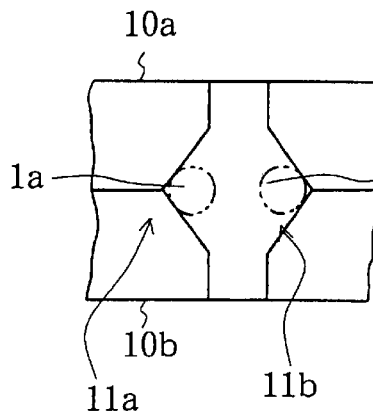
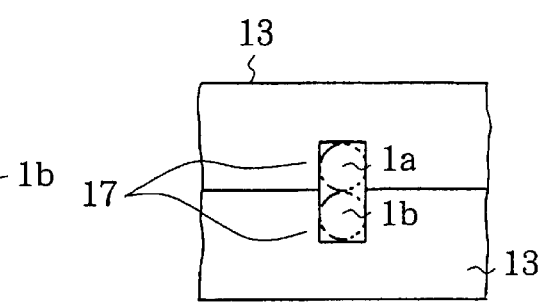
FIG.11  FIG.12

Fabrication of through-hole and fixing grooves by RIE.

Fabrication of V-grooves by anisotropic etching with TMAH.

Fabrication of through-holes by RIE.

Joining base to bottom face of frame.

Inserting and fixing optical fibres in fixing grooves.

Joining cover to top face of frame.

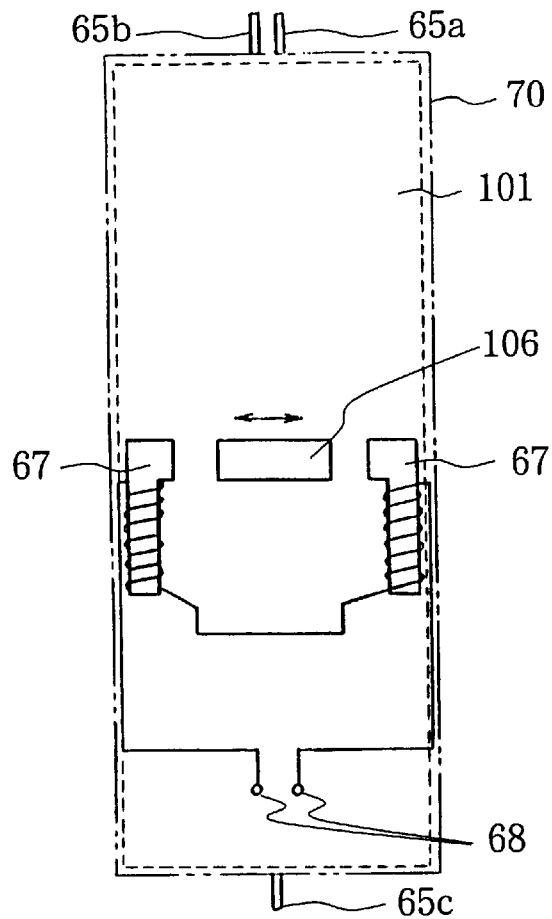
FIG.62
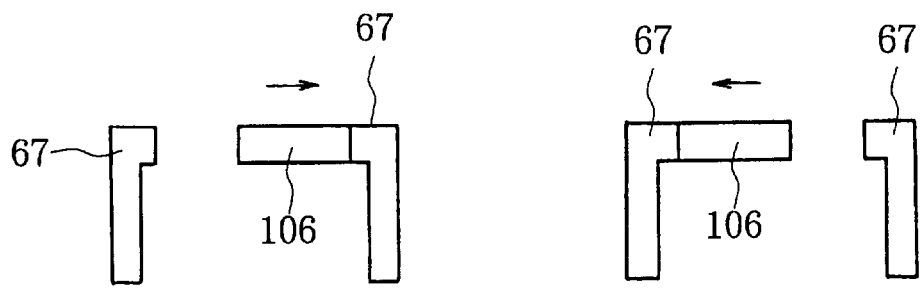
FIG.63
FIG.64

OPTICAL SWITCH

This is a continuation of International Application No. PCT/JP99/03764 filed Jul. 13, 1999 which designated the U.S.

TECHNICAL FIELD

This invention can be utilized for optical communications, and relates to an optical switch that changes the optical propagation path by producing a mechanical displacement of the end portion of an optical fiber. It relates in particular to an optical switch for alternately switching between two optical paths comprising a pair of optical fibers.

This invention also relates to an optical switch provided at an optical fiber branch-point. It can be utilized as an optical path changeover switch in fields such as optical communications and optical instrumentation, where an optical signal propagates through optical fibers. This invention also relates to the application of micro-machining technology to optical switches.

BACKGROUND TECHNOLOGY

Optical switches capable of changing the signal route by changing the path taken by an optical signal are required in telecommunication switching systems and the like. Technology is known for implementing a mechanical optical switch that causes the end portion of a movable optical fiber to oppose the end portion of either one of a pair of fixed optical fibers. With regard to this mechanical optical switch, technology is known for aligning the end portions of two opposing optical fibers by disposing the end portions of the two fibers in a single V-groove (for example, JP 8-20618 B, JP 6-273680 A, JP 6-208064 A and JP 6-265799 A).

Such optical switch technology can be used to bring the end portion of a single movable optical fiber into correspondence with the end portion of any one of two or more fixed optical fibers, and the resulting switch is termed a 1×2 optical switch or a 1×n optical switch.

However, the configuration of communication circuits is such that 2×2 optical switches are required. In a 2×2 optical switch, the end portions of two movable optical fibers oppose the end portions of two fixed optical fibers in such manner that the optical inputs can be mutually switched between the optical outputs. This can be implemented in practice using an optical branch circuit and two 1×2 optical switches, but an optical switching unit containing a large number of optical switches implemented in this way ends up being physically large and having a large optical loss due to the optical branch circuits.

A mechanical 2×2 optical switch designed to overcome this problem has been disclosed in JP 8-220456 A, which describes technology for implementing an optical path switch by providing a quadrilateral hole, arranging the end portions of fixed optical fibers at two corners of this hole, arranging the end portions of movable optical fibers at the other two corners of the hole, and employing electromagnetic means to change the position of the movable optical fibers.

Although the construction disclosed in the aforementioned patent publication, namely, arranging the end portions of optical fibers at respective corners of a quadrilateral opening, is excellent, it necessitates extremely high precision machining in order to realize an optical switch with little optical loss. Namely, to align the respective optical axes of the fixed optical fibers and the opposing movable optical fibers, it is necessary to produce a mirror finish on the inner walls of the opening. An optical switch with such a construction is unsuited to mass production and would therefore be expensive. Moreover, the fabrication step of producing a mirror finish has a poor yield, and this is another reason why such a component would be expensive. Furthermore, the optical switch itself has to be of sufficient size to enable such high precision surface machining to be performed, and hence a device utilizing a large number of such optical switches is inevitably of considerable size.

The present invention has been devised in the light of this situation. It is an object of this invention to provide a small 2×2 optical switch. It is a further object of this invention to provide a 2×2 optical switch that is well-suited to mass production. It is yet another object of the present invention to provide an optical switch that can be manufactured inexpensively and with high yield.

According to a well-known optical fiber switch construction, the end of an optical fiber is mounted on a movable member and the position of the optical fiber end is displaced mechanically by magnetic force. It is anticipated that this construction will provide a switch capable of stable operation with little signal attenuation. Moreover, this construction is similar in idea to an electromagnetic relay and will enable a reliable, stable product with uniform performance to be mass produced.

However, there is a limit as to how small a switching element with this construction can be made. That is to say, whereas many electronic components can now be fabricated in extremely small sizes, an optical switch is still relatively large.

The present invention has been devised in the light of this situation, and it is an object of the invention to further reduce the size of an optical switch of the type that switches optical paths by producing a mechanical displacement of optical fibers.

DISCLOSURE OF THE INVENTION

A distinguishing feature of the present invention according to a first aspect is a construction that facilitates inexpensive high-yield mass production of a 2×2 optical switch capable of mutually switching two optical communication paths comprising a pair of optical fibers.

Namely, the present invention is an optical switch comprising a pair of fixed optical fibers, a pair of movable optical fibers, a support member for supporting the end portions of these fixed optical fibers and movable optical fibers, and a drive mechanism mounted on this support member and producing a mechanical displacement of the end portions of the pair of movable optical fibers; wherein this drive mechanism includes means for producing displacement between a first position in which the optical axes of the end portions of the pair of movable optical fibers are respectively aligned with the optical axes of the end portions of the fixed optical fibers, and a second position in which the optical axes of the end portions of the pair of movable optical fibers are respectively aligned, in the reverse order to that of the first position, with the optical axes of the end portions of the fixed optical fibers. A distinguishing feature of this optical switch is that a pair of V-grooves are formed in the aforementioned support member, these V-grooves being arranged so that their opening portions are opposed and so that the end portions of the pair of fixed optical fibers are held in the respective bottom portions of the pair of grooves. A further distinguishing feature of this optical switch is that the aforementioned drive mechanism includes electromagnetic means for causing the end portions of the pair of movable optical fibers to come into contact with respective walls of this pair of V-grooves.

The support member can comprise two thin sheets stuck together, with a pair of beams formed on each such sheet. According to this construction, the pair of V-grooves appear at the face where the two thin sheets are stuck together, with the bottoms of the grooves lying within the plane at which the two sheets are stuck together. The pair of V-grooves thereby formed constitute part of an opening at the face where the two sheets are stuck together, and this opening has an hexagonal cross-section.

Preferably, the support member also includes means for holding the pair of movable optical fibers at a short distance from their ends, so that their end portions are cantilevered and their axes are positioned within a plane perpendicular to the plane containing the bottoms of the V-grooves. The aforementioned electromagnetic means preferably includes means for causing the ends of the pair of movable optical fibers to move in mutually different directions towards the walls of the V-grooves within a plane approximately perpendicular to the fiber axes, and means for causing the ends of the pair of movable optical fibers to turn through approximately 90 degrees to the left and to the right within this plane.

The aforementioned two thin sheets are silicon sheets and the grooves can be formed by etching.

The end portions of the pair of fixed optical fibers are fixed in the vicinity of one lengthwise end of the support member. The pair of movable optical fibers are fixed in the vicinity of the other end in such manner that their end faces are aligned with the end faces of the pair of fixed optical fibers and optical paths are formed. A drive mechanism is mounted on the support member, this drive mechanism producing mechanical displacement of the pair of movable optical fibers.

The end portions of the pair of fixed optical fibers are arranged horizontally with a prescribed gap (equivalent, for example, to the diameter of one of the movable optical fibers) between them, and the pair of movable optical fibers are arranged so that their end portions are perpendicular to the position in which the fixed optical fibers are mounted. This means that the movable optical fibers can be moved to two positions. In the first position, the optical axes of their end portions coincide with the optical axes of the end portions of the pair of fixed optical fibers. In the second position, the optical axes of their end portions also coincide with the optical axes of the end portions of the pair of fixed optical fibers, but the movable optical fibers have been reversed. When the drive mechanism has moved the pair of movable optical fibers one way or the other, the end portions of these movable optical fibers and the end portions of the pair of fixed optical fibers are switched to and optically coupled in either this first or second position.

A pair of V-grooves are formed in the support member that supports the end portions of the pair of fixed optical fibers, this pair of V-grooves being arranged with their opening portions opposed. The end portions of the pair of fixed optical fibers are held in the respective bottom portions of the V-grooves. Because the periphery of a fixed optical fiber is held in contact with both faces of a V-groove, the fixed optical fibers are maintained in a stable condition in which they do not slip out of the position in which they have been arranged.

An electromagnetic means is used for the drive mechanism that produces a mechanical displacement of the end portions of the movable optical fibers, and magnetic forces are employed to bring the end portions of the pair of movable optical fibers into contact with alternate walls of the pair of V-grooves. Once the end portions of the movable optical fibers have come into contact with the V-groove walls, they move along the walls and bed down into the bottom portions of opposing V-grooves. Because an electromagnetic means is used, a mechanical drive means is not needed and hence the configuration of the drive mechanism can be simplified.

The support member can be formed by sticking together two frames each formed from a thin sheet. Each frame comprises one face at which the V-grooves appear when the two frames are stuck together, a pair of beams that can be displaced to the left and the right when driven by the electromagnetic means, a linking portion which links the pair of beams to each other at their middle portion, a fixing groove for introducing and fixing the movable optical fibers, and a guide groove for guiding the movable optical fibers from the linking portion to the V-grooves. A difference in level is formed by lowering the top surface of the frame (the face at which the V-grooves appear when the two frames are stuck together) by a prescribed amount (for example, by 5 to 10 $\mu$m) in the regions occupied by the pair of beams and the linking portion. This results in a space forming when the two frames are stuck together, thereby preventing the opposing beams from coming into contact with each other.

By designing the frame with a shape that has left-right symmetry with respect to a center line drawn along its longer direction, only one type of frame needs to be formed, and two of these can be stuck together to obtain the support member. This enables the number of components to be reduced.

If such frames are stuck together with the V-groove faces on the inside, a pair of opposed V-grooves are formed, and these constitute part of an opening with an hexagonal cross-section. By employing this geometry, the need for machining technology is eliminated and high-precision V-grooves can be formed without incurring high production costs.

Because a difference in level is formed between the top surface of the outer periphery of the frames and their surface in the region of the beams and their linking portion, when the two frames have been stuck together there is a space between the beams and linking portion of the top frame and the beams and linking portion of the bottom frame. This space prevents interference between the top and bottom beams and linking portion when these are displaced in different directions.

The axes of the movable optical fibers are positioned in a plane perpendicular to the plane containing the bottoms of the V-grooves (see FIG. 11 and FIG. 12), and the end faces of the movable fibers are aligned with the end faces of the pair of fixed optical fibers (see FIG. 5). The movable optical fibers are fixed in the guide grooves formed in the linking portions to give a cantilever structure.

The electromagnetic means causes the end portions of the pair of movable optical fibers to move in mutually different directions towards the walls of the V-grooves and within a plane parallel to the plane perpendicular to the plane containing the bottoms of the V-grooves. In other words, when the movable optical fiber held in the upper frame is moved to the left, the movable optical fiber held in the lower frame is moved to the right, and when the upper movable optical fiber is moved to the right, the lower movable optical fiber is moved to the left.

Accompanying the left and right movements of the movable optical fibers, their end portions make contact with the left or right V-groove faces, turn through approximately 90 degrees to the left and right along the V-shape within a plane approximately perpendicular to the fiber axes, sink into the bottoms of the V-grooves, and stop in a position in which their end faces are approximately aligned with the end faces of the fixed optical fibers. As a result, the pair of movable optical fibers and the pair of fixed optical fibers are switched to and optically coupled in a position in which their cores are approximately aligned.

Thin silicon sheets are used for the two frames that form the support member, and the V-grooves and the pair of beams and their linking portion are all formed by etching these silicon sheets.

The construction outlined above will enable a small 2×2 optical switch with low optical loss to be manufactured inexpensively with high yield, and will provide a switch that is very well suited to mass production.

It will therefore be possible to mass produce, inexpensively and with high yield, a small 2×2 optical switch with a construction giving low optical loss. Namely, the optical paths through the switch can be interchanged while ensuring that the ends of the two movable optical fibers always end up facing the ends of the two fixed optical fibers.

A further distinguishing feature of this invention is a construction that enables an optical switch provided at a branch point of an optical fiber to be made even smaller, and a fabrication method for this construction.

Namely, in a second aspect the present invention is an optical switch comprising a single frame, two parallel beams provided on the inside of this frame, a linking portion provided in approximately the middle of the beams and serving to interlink the beams, and a single optical fiber supported at one end of the frame and at the linking portion, and arranged parallel to the beams and so that its end portion reaches the other end of the frame. A pair of V-grooves are formed at this other end of the frame at a position contiguous with the end portion of the single optical fiber, in such manner that their opening portions are opposed and the grooves run parallel to the beams. A pair of optical fibers are arranged with their end portions in contact with the respective V-grooves. Depending on the displacement of the aforementioned single optical fiber, one or other of the ends of this pair of optical fibers faces the single optical fiber.

Preferably, the frame and the two beams are a continuous body cut from a single silicon wafer, the frame is rectangular, and the beams are formed parallel to the long sides of this rectangle.

The two parallel beams are provided on the inside of the single frame and the approximately middle portions of the beams are joined by the linking portion. A fixing groove is formed in the one end of the frame and in the linking portion, and the single optical fiber is arranged parallel to the beams and fixed in these fixing grooves. An opening is provided at the other end of the frame and parallel to the beams, and a pair of V-grooves are formed in this opening. The end portion of the single optical fiber, which has been fixed to the first end of the frame, is movably arranged between the pair of V-grooves at the end of the grooves that is nearer the linking portion, and the end portions of the pair of optical fibers are arranged and fixed in the pair of V-grooves so that, according to the displacement of the end portion of the single optical fiber, one or other of the ends of the pair of fibers will face the end of the single optical fiber.

This construction ensures that when the linking portion moves to the left or the right, the end of the single optical fiber faces the end of one or other of the pair of optical fibers in the V-grooves, thereby switching the optical path.

Magnetic members are incorporated in the linking portion, a magnet is provided on the outside of the frame, and the beams are bent and the linking portion displaced by means of magnetic force applied by the magnet. By utilizing magnetic force, the need to provide an electrical or mechanical means for displacing the beams is eliminated, whereby a smaller switch can be obtained.

With this construction the length of the longer side of the frame can be from 5 to 25 mm, thereby giving an extremely small optical switch. After the optical path has been switched, light passes directly into an opposing optical fiber, and hence this construction can provide an optical switch with only small losses occurring in the switching part.

The frame is filled with index-matching oil and packaged in a sealed container. The resistance of the index-matching oil ensures that the optical fiber moves in a stable way during switching and suppresses vibration of the end of the fiber during switching.

In a third aspect the present invention is a method for fabricating an optical switch, comprising first of all employing reactive ion etching to make an opening in the end portion of a silicon wafer where the V-grooves will be formed, then forming the V-grooves on the sides of this opening by anisotropic etching. Reactive ion etching is then employed to integrally cut out a component comprising a single frame, two parallel beams formed continuously with the frame on its inside, and a linking portion linking these beams. The bottom face of this component is joined to a base on which an indentation has been provided in the vicinity of the structure constituting the drive portion. A pair of optical fibers are inserted and fixed in the V-grooves, a single movable optical fiber is inserted and fixed in the linking portion, and the top face of this component is joined to a cover on which an indentation has been provided in the vicinity of the structure constituting the drive portion.

A distinguishing feature of the fabrication method according to this invention is that, instead of individually forming a plurality of components and then assembling these, reactive ion etching is applied to a single piece of material to form the frame and the other components in integral fashion.

Namely, the fixing grooves for the insertion of the pair of optical fibers and for the insertion of the single optical fiber arranged opposing this pair of optical fibers, are formed when the V-grooves are created. The two parallel beams provided inside the single frame and the linking portion that links the beams at approximately their middle portion, are formed integrally from one and the same piece of material. A base on which an indentation has been provided in correspondence with the position of the drive portion is then joined to the bottom face of this piece of material.

At this stage of the fabrication process, a pair of optical fibers are inserted and fixed in one fixing groove so that their end portions are in contact with respective V-grooves; a single optical fiber that will oppose this pair of fibers is inserted and fixed in the other fixing groove; and a cover provided with an indentation corresponding to the position of the drive portion is joined to the top face of the frame.

This fabrication method ensures that separate operations are no longer required for mounting the drive portion—within which the end portions of the optical fibers are arranged in contact with the V-grooves—on the beams, or for mounting the beams on the frame. As a result, further advances can be made in miniaturization, which was previously limited by the need to be able to assemble these various components. This fabrication method also decreases the number of fabrication steps involved and can therefore reduce manufacturing costs. Moreover, because fewer manual fabrication steps are involved, product quality is more stable and mass production of a highly reliable product is feasible.

BRIEF DESCRIPTION OF THE DRAWINGS

FIG. 7 and FIG. 8 are enlarged sectional views serving to explain the method for positioning the two frames in the first embodiment.

FIG. 9 and FIG. 10 are enlarged sectional views serving to explain another method for positioning the two frames in the first embodiment.

FIG. 11 is a view of the support member of the first embodiment, along arrow B shown in FIG. 3.

FIG. 12 is a view of the support member of the first embodiment, along arrows C and D shown in FIG. 3.

FIG. 62 is a lengthwise rear view of the frame in the sixth embodiment.

FIG. 63 and FIG. 64 are partial rear views serving to explain the movement of the magnet in the sixth embodiment.

PREFERRED EMBODIMENTS OF THE INVENTION

Embodiments of this invention will be described on the basis of the accompanying drawings.

First Embodiment

Figure 1:
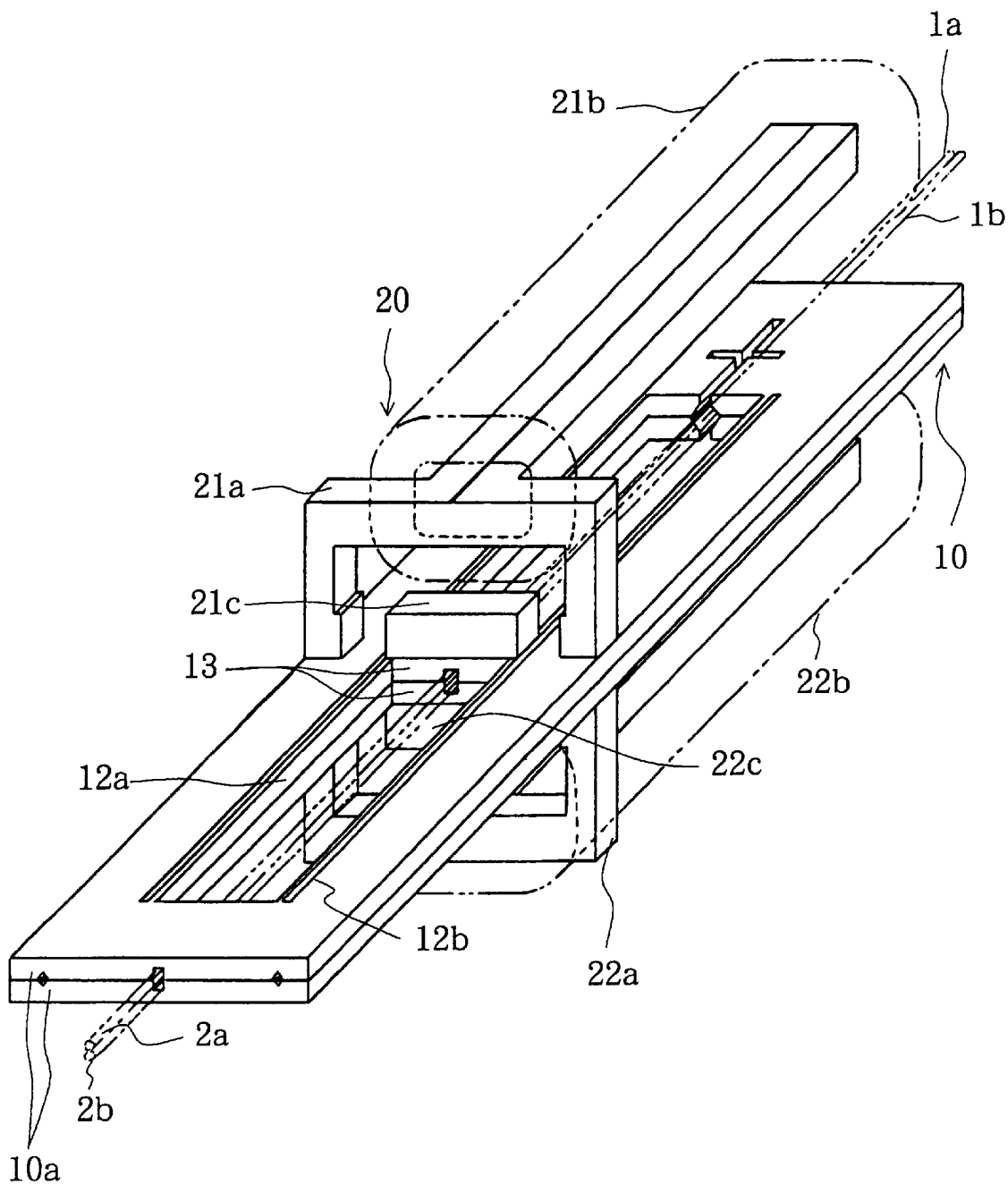
FIG. 1 is an enlarged perspective view showing the configuration of a first embodiment of this invention.
Figure 2:
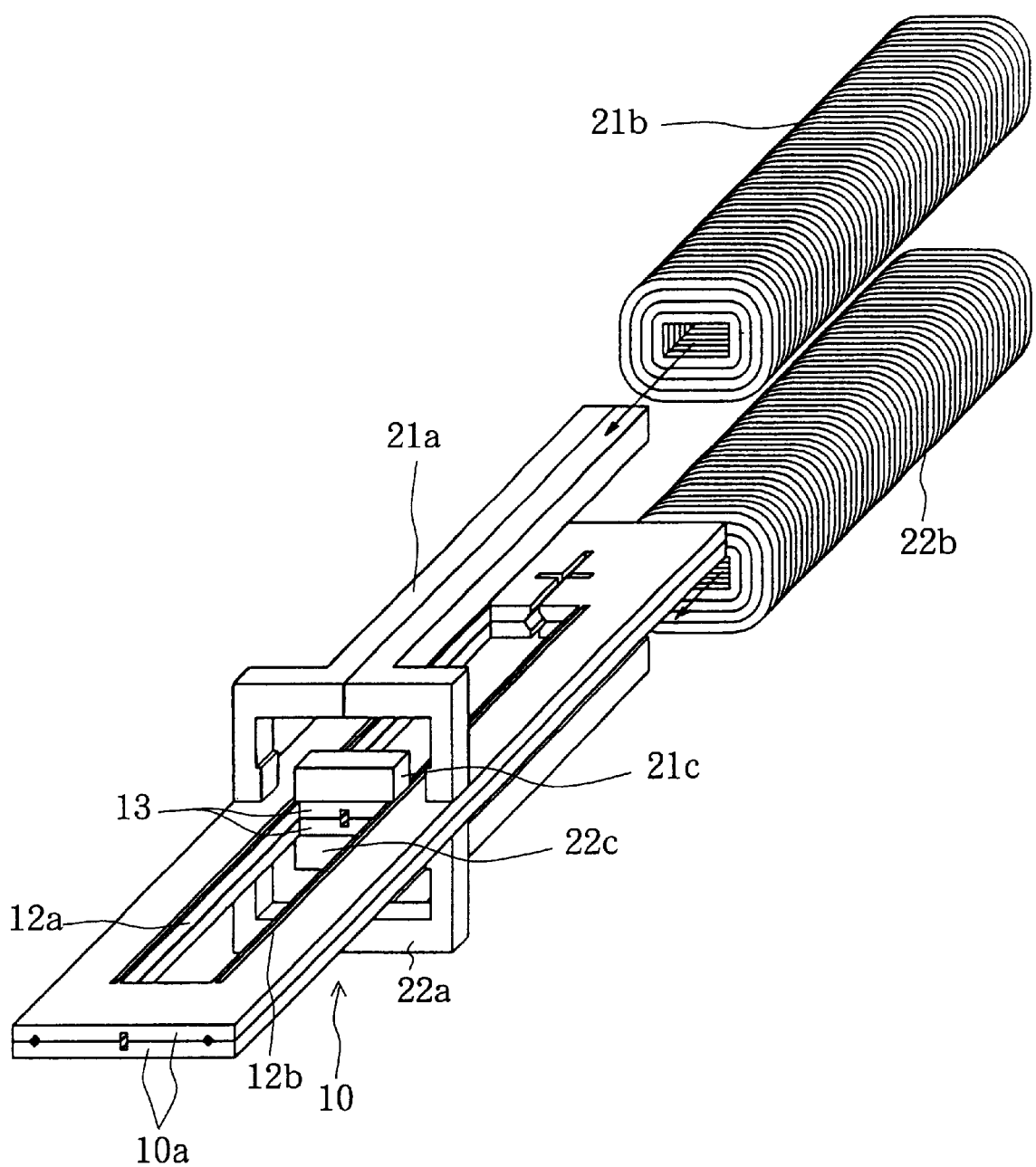
FIG. 2 is an enlarged exploded perspective view showing the configuration of the first embodiment.

FIG. 1 is an enlarged perspective view showing the configuration of a first embodiment of this invention, and FIG. 2 is an enlarged exploded perspective view of the same.

This first embodiment comprises a pair of fixed optical fibers 1a and 1b, a pair of movable optical fibers 2a and 2b, support member 10 for supporting the end portions of these fixed optical fibers and movable optical fibers, and drive mechanism 20 mounted on this support member and serving to produce a mechanical displacement of the end portions of the pair of movable optical fibers 2a and 2b.

Figure 3:
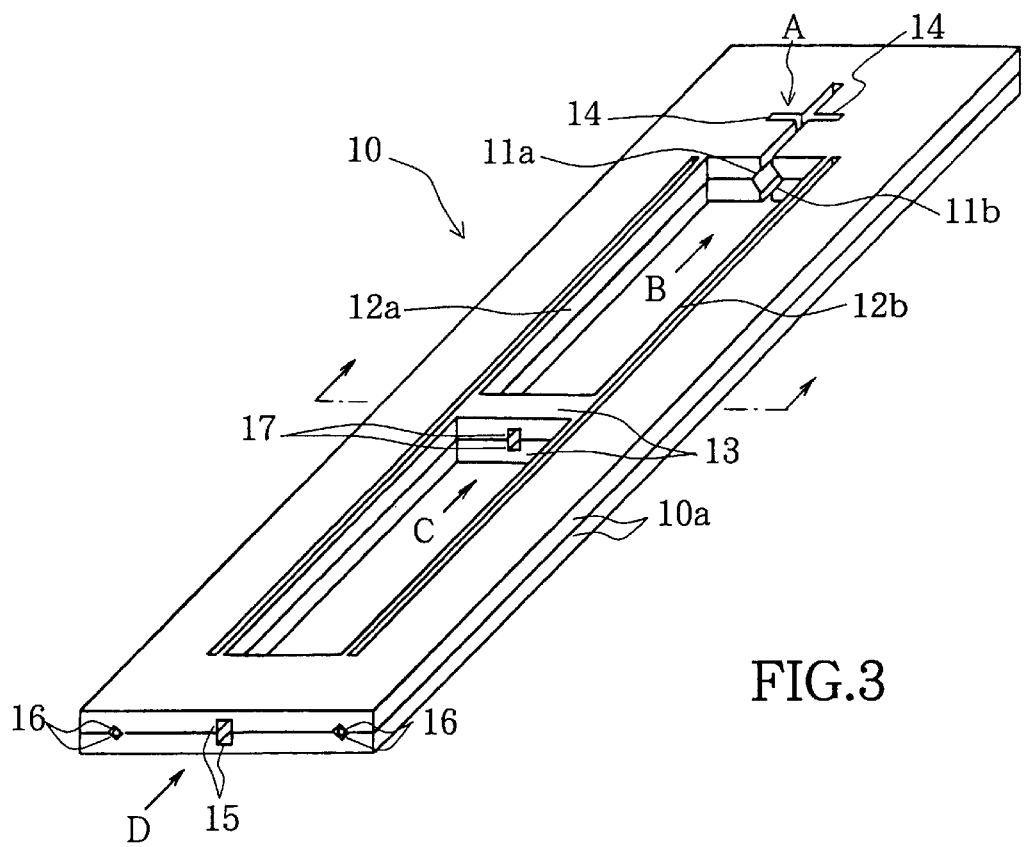
FIG. 3 is an enlarged perspective view showing the shape of the support member in the first embodiment.
Figure 4:
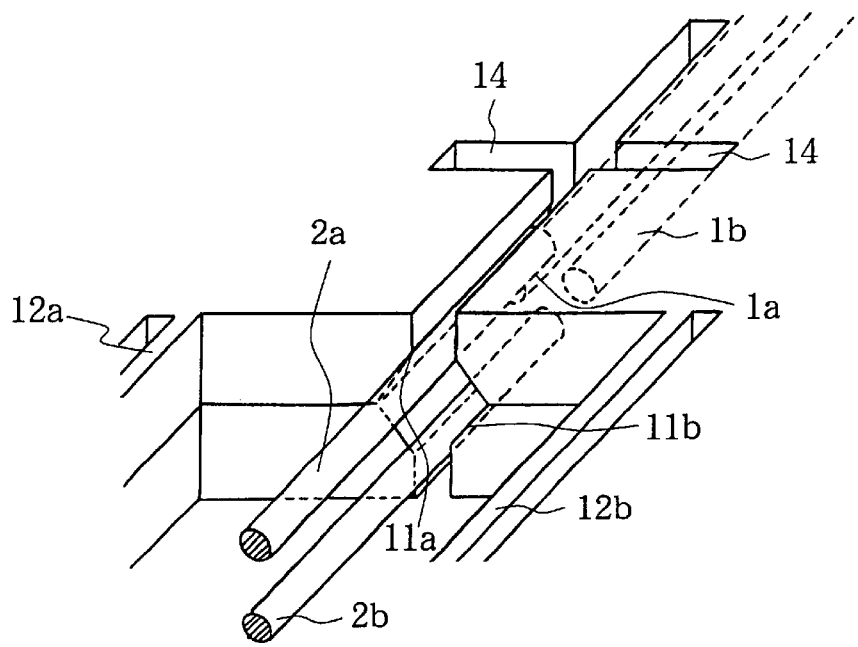
FIG. 4 is an enlarged perspective view of portion A in FIG. 3, showing optical fibers mounted in the support member in the first embodiment.
Figure 5:
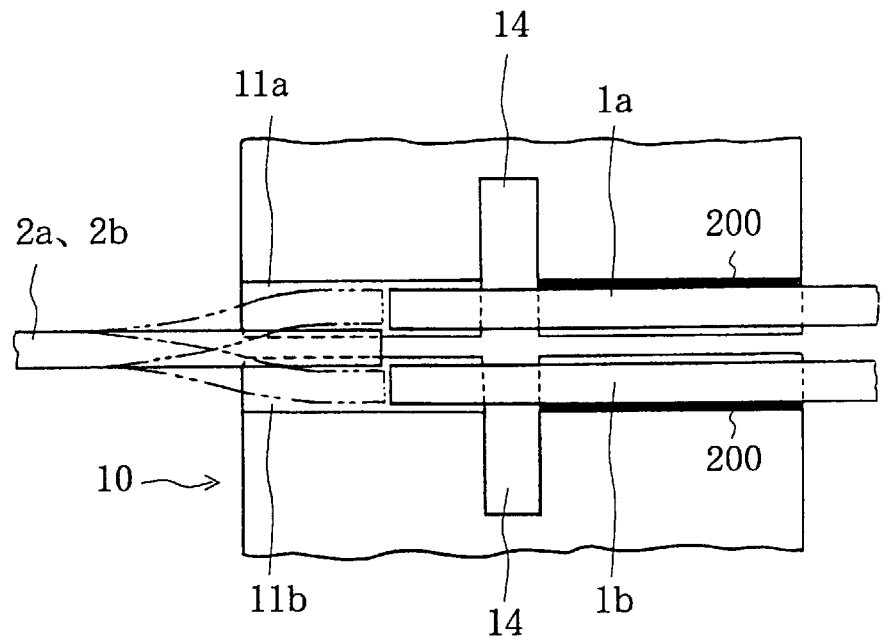
FIG. 5 is an enlarged interior plan view of FIG. 4, showing optical fibers mounted in the support member in the first embodiment.

FIG. 3 is an enlarged perspective view showing the shape of the support member in the first embodiment; FIG. 4 is an enlarged perspective view of portion A in FIG. 3 and showing optical fibers mounted in the support member in the first embodiment; and FIG. 5 is an enlarged interior plan view of FIG. 4 and showing optical fibers mounted in the support member in the first embodiment.

Figure 6:
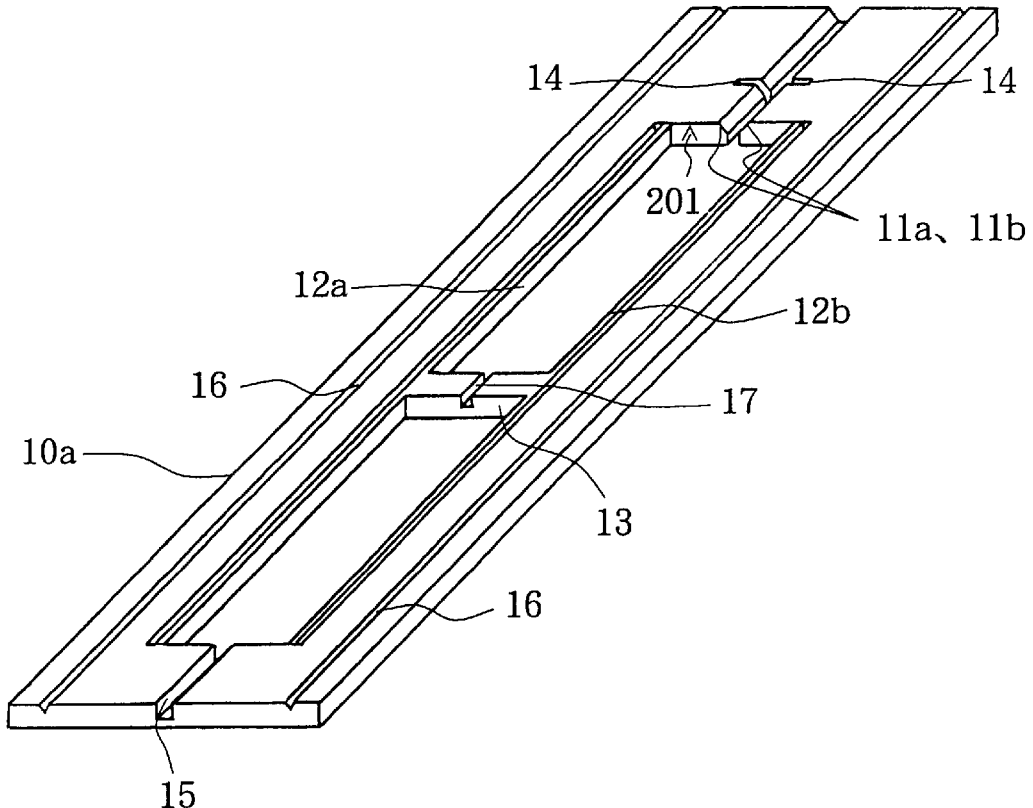
FIG. 6 is an enlarged perspective view showing the shape of a frame in the first embodiment.

A pair of V-grooves 11a and 11b arranged with their opening portions opposing are formed in support member 10, and the end portions of the pair of fixed optical fibers 1a and 1b, are held in the respective bottoms of the grooves. This support member 10 has the following construction. Namely, when two frames 10a are stuck together, each frame 10a having been formed from a thin sheet of silicon as illustrated in FIG. 6, the pair of V-grooves 11a and 11b appear at the face where the two frames are stuck together.

A frame 10a has two parallel beams 12a and 12b provided on the inside of the frame, linking portion 13 provided in approximately the middle of these beams and linking them together, escape groove 14 for preventing influx of adhesive 200 that is used to bond fixed optical fibers 1a and 1b, fixing groove 15 for fixing movable optical fiber 2a or 2b, and a pair of positioning grooves 16 for use when two frames 10a are stuck together. Guide groove 17 is formed in linking portion 13, this guide groove serving to guide movable optical fiber 2a or 2b to V-grooves 11a and 11b.

Difference in level 201 is formed by lowering the surface of the pair of beams 12a and 12b and of linking portion 13 on the V-groove side of frame 10a to 5–10 μm below the surface of the outer periphery of the frame. This difference in level 201 results in a space of 10–20 μm forming between beams 12a and 12b on the upper frame and beams 12a and 12b on the lower frame when support member 10 is formed by sticking two frames 10a together with their V-groove sides on the inside.

When two frames 10a are to be stuck together, optical fiber 203 for positioning is fixed as shown in FIG. 7 in the two positioning grooves 16 that have been formed in frames 10a on their sides that will be stuck together, and the frames are fixed together with positioning grooves 16 aligned as shown in FIG. 8.

This ensures that support member 10 is formed on the basis of the upper and lower frames being stuck together with high precision and without any horizontal deviation.

The pair of frames 10a can also be positioned by forming alignment groove 18 in one frame 10a as shown in FIG. 9, and in the other frame 10a forming protruding ridge 19 of shape that will mesh into alignment groove 18, and then fitting the ridge into the groove as shown in FIG. 10.

FIG. 11 is a view of the support member according to the first embodiment, looking along arrow B shown in FIG. 3. By sticking together frames 10a, V-grooves 11a and 11b of support member 10 appear as part of an opening at the stuck together faces, this opening having a hexagonal cross section. Fixed optical fibers 1a and 1b are fixed closely to the bottom parts of these grooves by adhesive.

FIG. 12 is a view of the support member according to the first embodiment, looking along arrows C and D shown in FIG. 3. Movable optical fibers 2a and 2b are fixed with adhesive in fixing grooves 15 that have been formed in frames 10a. They are also fixed in guide grooves 17 that have been formed in linking portions 13, thereby giving a cantilever structure within a plane perpendicular to the plane containing the bottoms of V-grooves 11a and 11b. In particular, movable optical fibers 2a and 2b are fixed in a position such that their end faces can be brought into alignment with the end faces of fixed optical fibers 1a and 1b in the manner shown in FIG. 4 and in FIG. 5.

Figures 13, 14:
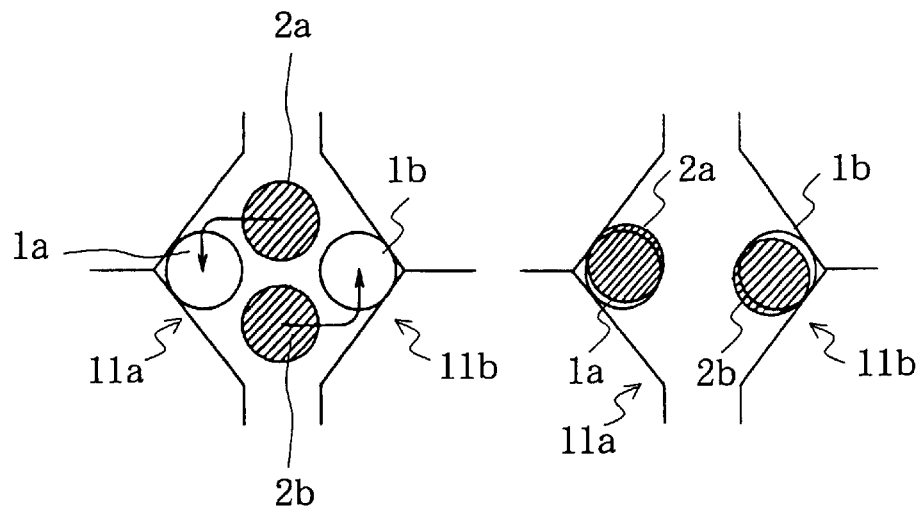
FIG. 13 and FIG. 14 serve to explain the displacement of the movable optical fibers to the first position in the first embodiment.
Figures 15, 16:
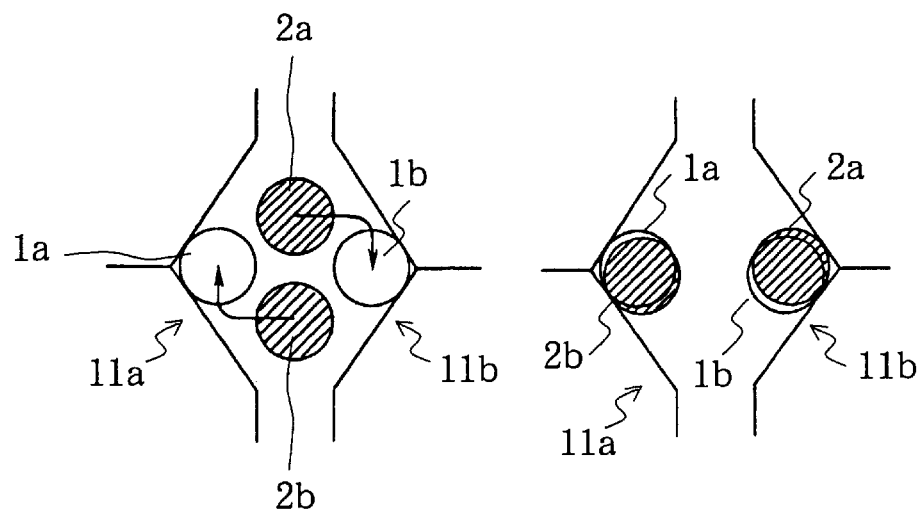
FIG. 15 and FIG. 16 serve to explain the displacement of the movable optical fibers to the second position in the first embodiment.

Drive mechanism 20 for producing a mechanical displacement of the end portions of movable optical fibers 2a and 2b held in a cantilever structure in this manner, comprises first electromagnetic means and second electromagnetic means for causing displacement between a first and a second position. The first position is reached when, as shown in FIG. 13, the end portions of the pair of movable optical fibers 2a and 2b are made to turn through 90 degrees in mutually different directions and are brought into contact with the walls of V-grooves 11a and 11b. In this first position, as shown in FIG. 14, the end face of movable optical fiber 2a coincides with the end face of fixed optical fiber 1a, and the end face of movable optical fiber 2b coincides with the end face of fixed optical fiber 1b. The second position is reached when, as shown in FIG. 15, the end portions of the pair of movable optical fibers 2a and 2b are made to turn in the opposite directions through 90 degrees and are brought into contact with the walls of V-grooves 11a and 11b. In this second position, as shown in FIG. 16, the end face of movable optical fiber 2a coincides with the end face of fixed optical fiber 1b, and the end face of movable optical fiber 2b coincides with the end face of fixed optical fiber 1a.

As shown in FIG. 1 and FIG. 2, the first electromagnetic means comprises first core 21a, first coil 21b, and first permanent magnet 21c fixed to linking portion 13 of top frame 10a. First permanent magnet 21c is arranged between the two magnetic poles of first core 21a.

The second electromagnetic means comprises second core 22a, second coil 22b, and second permanent magnet 22c fixed to linking portion 13 of lower frame 10a. Second permanent magnet 22c is arranged between the two magnetic poles of second core 22a.

The method of fabricating the frames used in the first embodiment will now be described. FIG. 17 to FIG. 20 illustrate the steps involved in fabricating these frames.

Figure 17:
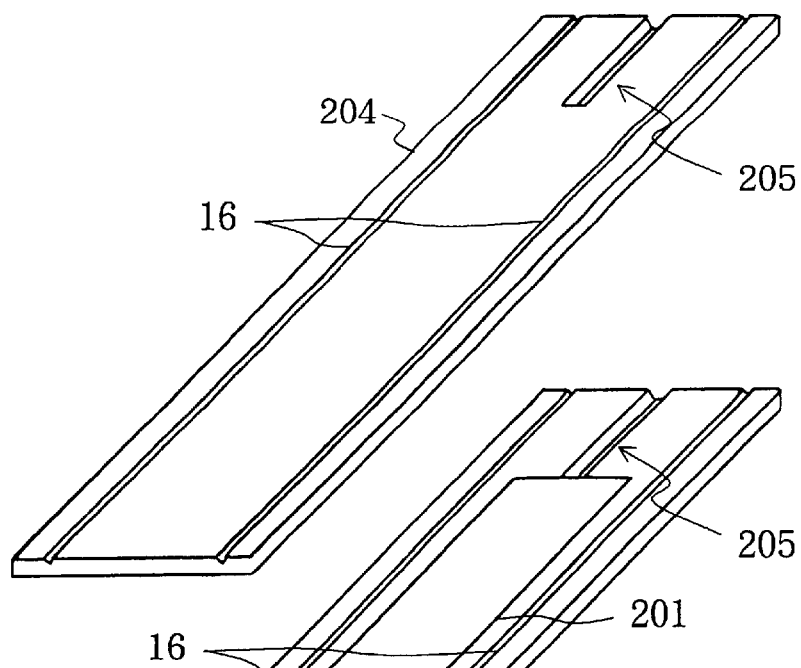
FIG. 17 to FIG. 20 show the steps involved in the fabrication of a frame used in the first embodiment.

Having obtained rectangular silicon wafer 204, this is heated at 1100° C. to form an oxide film on its surface. Silicon wafer 204 is then anisotropically etched with TMAH (tetramethylammonium hydroxide) to form groove 205, the sides of which form a V, and two positioning grooves 16. These various grooves are shown in FIG. 17. Groove 205 is subsequently used to fix optical fibers 1a and 1b.

Figure 18:
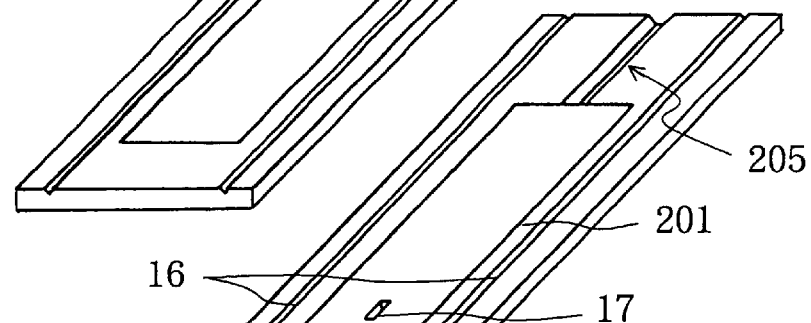

Next, as shown in FIG. 18, the region in which the pair of beams will be formed is lowered 5–10 μm by anisotropic etching with TMAH, thereby forming difference in level 201.

Figure 19:
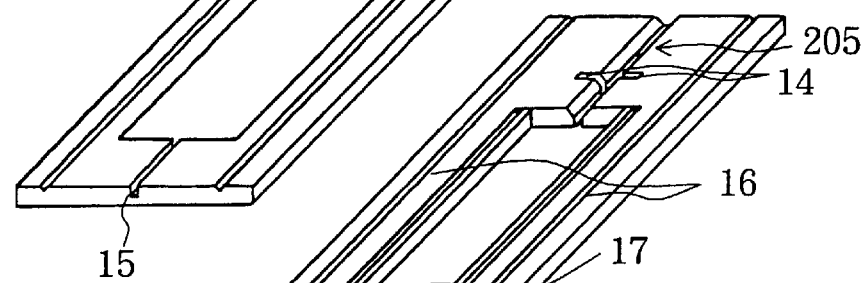
Figure 20:
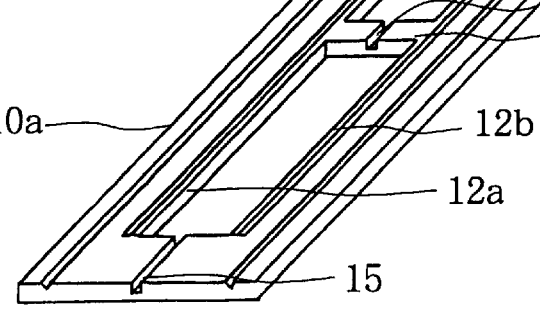

Fixing groove 15 and guide groove 17, in which movable optical fibers 2a and 2b will be fixed, are then formed by reactive ion etching. These grooves are shown in FIG. 19.

In the final step, beams 12a and 12b, linking portion 13, and escape grooves 14 are formed by removing the unnecessary portions of the silicon wafer. This is achieved by reactive ion etching from the reverse side of what has until now been the working face.

Optical fibers for positioning are fixed in each of the pair of positioning grooves 16 of frame 10a thus fabricated, and a second frame 10a is placed and fixed on top of this first frame so that the positioning grooves 16 of the second frame coincide with the optical fibers. Support member 10 shown in FIG. 3 is fabricated in this way.

Figure 21:
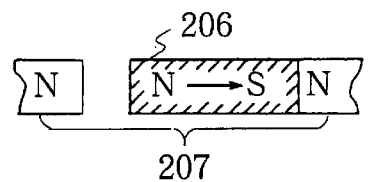
FIG. 21 to FIG. 24 serve to explain the operating principles of the first embodiment.
Figure 22:
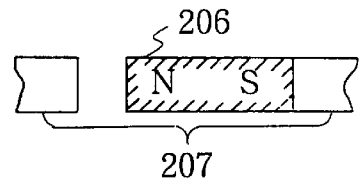

The working of this first embodiment of the invention will now be described. FIG. 21 to FIG. 24 serve to explain the operating principles of this first embodiment. It is assumed that when electric current is supplied to the coils of electromagnets 207, both of these opposing electromagnets become north poles as shown in FIG. 21. Under these circumstances, permanent magnet 206 arranged between the magnetic poles of electromagnets 207 experiences a repelling force at its north pole side and an attracting force at its south pole side and so moves to the right. If the electric current that has been supplied to electromagnets 207 is now interrupted, the polarity of electromagnets 207 disappears but permanent magnet 206 stays in contact with the core by attraction and remains in position as shown in FIG. 22.

Figure 23:
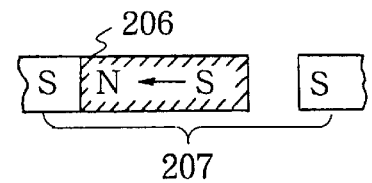
Figure 24:
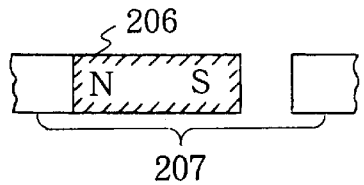

It is now assumed that electric current is supplied to the coils of electromagnets 207 in the opposite direction and that both of these opposing electromagnets become south poles as shown in FIG. 23. Under these circumstances, permanent magnet 206 arranged between the poles of electromagnets 207 experiences a repelling force at its south pole side and an attracting force at its north pole side and so moves to the left. If the current that has been supplied to electromagnets 207 is now interrupted, the polarity of electromagnets 207 disappears but permanent magnet 206 stays in contact with the core by attraction and remains in position as shown in FIG. 24.

Figures 25, 26:
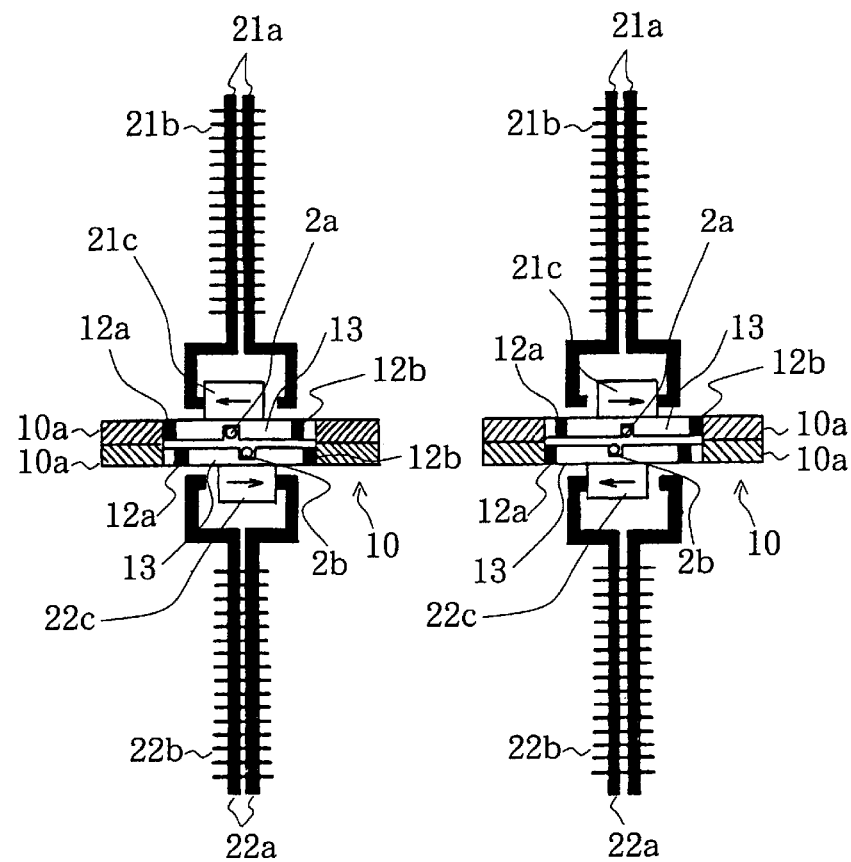
FIG. 25 and FIG. 26 serve to explain the switching action of the first embodiment.

The present invention is based on this principle, and FIG. 25 and FIG. 26 serve to explain its working.

It is assumed that the left sides of first permanent magnet 21c and second permanent magnet 22c are north poles and that their right sides are south poles. If electric current is temporarily supplied to first coil 21b in such manner that the opposing poles of first core 21a both become south poles, first permanent magnet 21c experiences the attracting and repelling forces of the first electromagnetic means and moves to the left as shown in FIG. 25.

This movement is accompanied by linking portion 13, to which first permanent magnet 21c is fixed, moving to the left together with beams 12a and 12b, whereupon movable optical fiber 2a moves to the left. The supply of current to first coil 21b is temporary and is interrupted when movable optical fiber 2a has moved. When this happens, although the polarity of first core 21a disappears, movable optical fiber 2a remains in its shifted position due to the attracting force of first permanent magnet 21c.

When movable optical fiber 2a moves in this manner to the left, its end portion moves to the left as shown in FIG. 13, comes into contact with the wall of V-groove 11a, turns downwards along this wall through approximately 90 degrees as shown by the arrow in FIG. 13, meshes with the bottom of V-groove 11a, and stops moving.

Because fixed optical fiber 1a is supported in the bottom of this V-groove 11a, the end face of movable optical fiber 2a after it has moved and the end face of fixed optical fiber 1a end up being approximately aligned, as shown in FIG. 14. As a result, movable optical fiber 2a and fixed optical fiber 1a are optically coupled and an optical communication path is formed.

If electric current is temporarily supplied to second coil 22b at the same time as current is supplied to first coil 21b, in such manner that the opposing poles of second core 22a both become north poles, second permanent magnet 22c experiences the attracting and repelling forces of second core 22a and moves to the right as shown in FIG. 25.

This movement is accompanied by linking portion 13, to which second permanent magnet 22c is fixed, moving to the right together with beams 12a and 12b, whereupon movable optical fiber 2b moves to the right. As a result of this movement of movable optical fiber 2b, its end portion moves to the right as shown in FIG. 13, comes into contact with the wall of V-groove 11b, turns upwards along this wall through approximately 90 degrees as shown by the arrow in FIG. 13, meshes with the bottom of V-groove 11b, and stops moving.

Because fixed optical fiber 1b is supported in the bottom of this V-groove 11b, the end face of movable optical fiber 2b after it has moved and the end face of fixed optical fiber 1b end up being approximately aligned, as shown in FIG. 14. As a result, movable optical fiber 2b and fixed optical fiber 1b are optically coupled and an optical communication path is formed.

To switch the optical paths from this state, electric current is temporarily supplied to first coil 21b in such manner that the opposing poles of first core 21a both become north poles. As result of supplying this current, first permanent magnet 21c experiences the attracting and repelling forces of the first electromagnetic means and moves to the right as shown in FIG. 26.

This movement is accompanied by linking portion 13, to which first permanent magnet 21c is fixed, moving to the right together with beams 12a and 12b, whereupon movable optical fiber 2a moves to the right. Movable optical fiber 2a then remains in this shifted position due to the attracting force of first permanent magnet 21c.

As a result of this movement of movable optical fiber 2a, its end portion moves to the right as shown in FIG. 15, comes into contact with the wall of V-groove 11b, turns downwards along this wall through approximately 90 degrees as shown by the arrow in FIG. 15, meshes with the bottom of V-groove 11b, and stops moving. Because fixed optical fiber 1b is supported in the bottom of this V-groove 11b, the end face of movable optical fiber 2a after it has moved and the end face of fixed optical fiber 1b end up being approximately aligned, as shown in FIG. 16. As a result, movable optical fiber 2a and fixed optical fiber 1b are optically coupled and an optical communication path is formed.

If electric current is temporarily supplied to second coil 22b at the same time as current is supplied to first coil 21b, in such manner that the opposing magnetic poles of second core 22a both become south poles, second permanent magnet 22c experiences the attracting and repelling forces of the second electromagnetic means and moves to the left as shown in FIG. 26.

This movement is accompanied by linking portion 13, to which second permanent magnet 22c is fixed, moving to the left together with beams 12a and 12b, whereupon movable optical fiber 2b moves to the left and remains in that shifted position.

As a result of this movement of movable optical fiber 2b, its end portion moves to the left as shown in FIG. 15, comes into contact with the wall of V-groove 11a, turns upwards along this wall through approximately 90 degrees as shown by the arrow in FIG. 15, meshes with the bottom of V-groove 11a, and stops moving.

Because fixed optical fiber 1a is supported in the bottom of this V-groove 11a, the end face of movable optical fiber 2b after it has moved and the end face of fixed optical fiber 1a end up being approximately aligned, as shown in FIG. 16.

As a result, movable optical fiber 2b and fixed optical fiber 1a are optically coupled and an optical communication path is formed.

Second Embodiment

Figure 27:
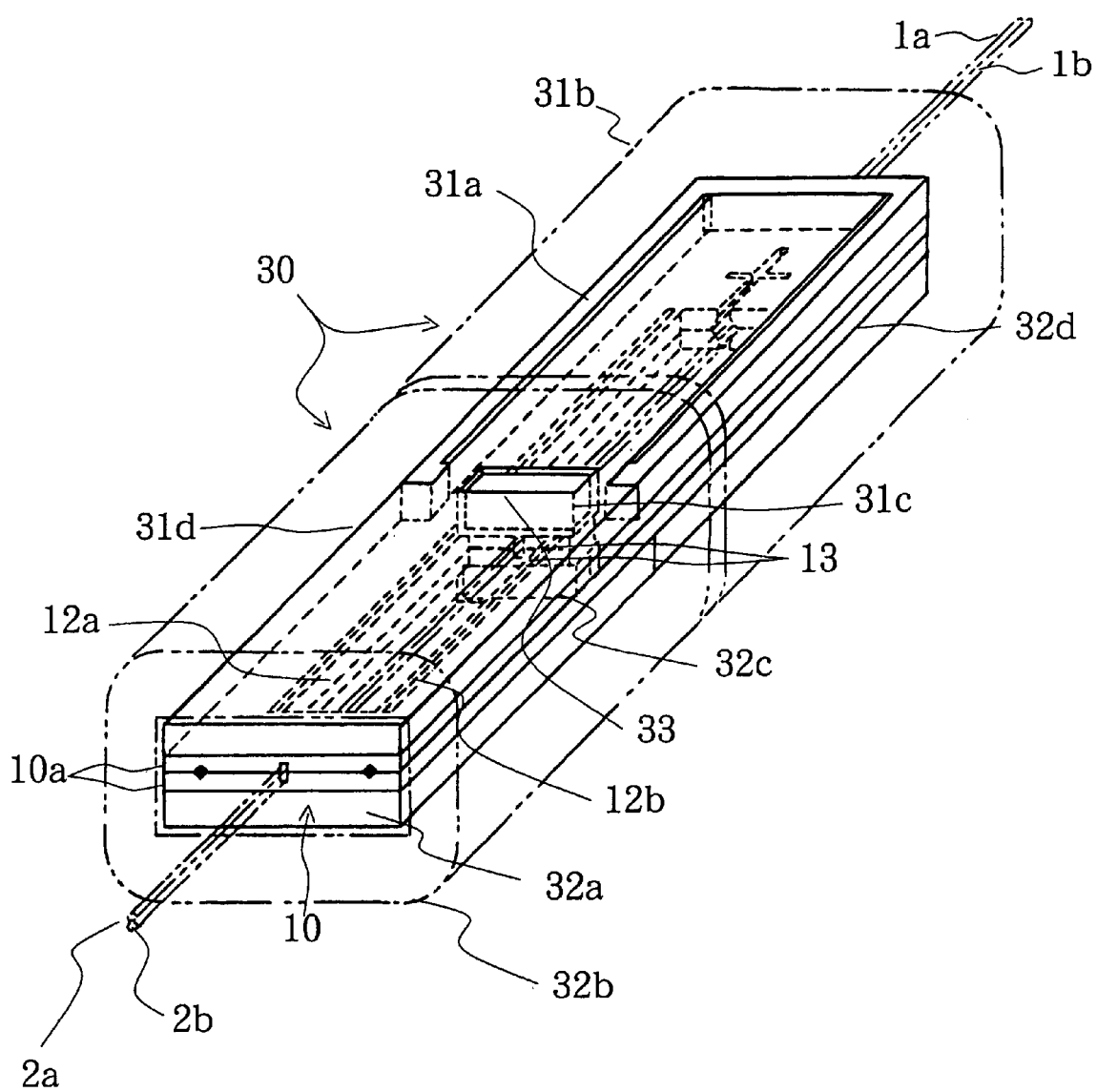
FIG. 27 is an enlarged perspective view showing the configuration of a second embodiment of this invention.
Figure 28:
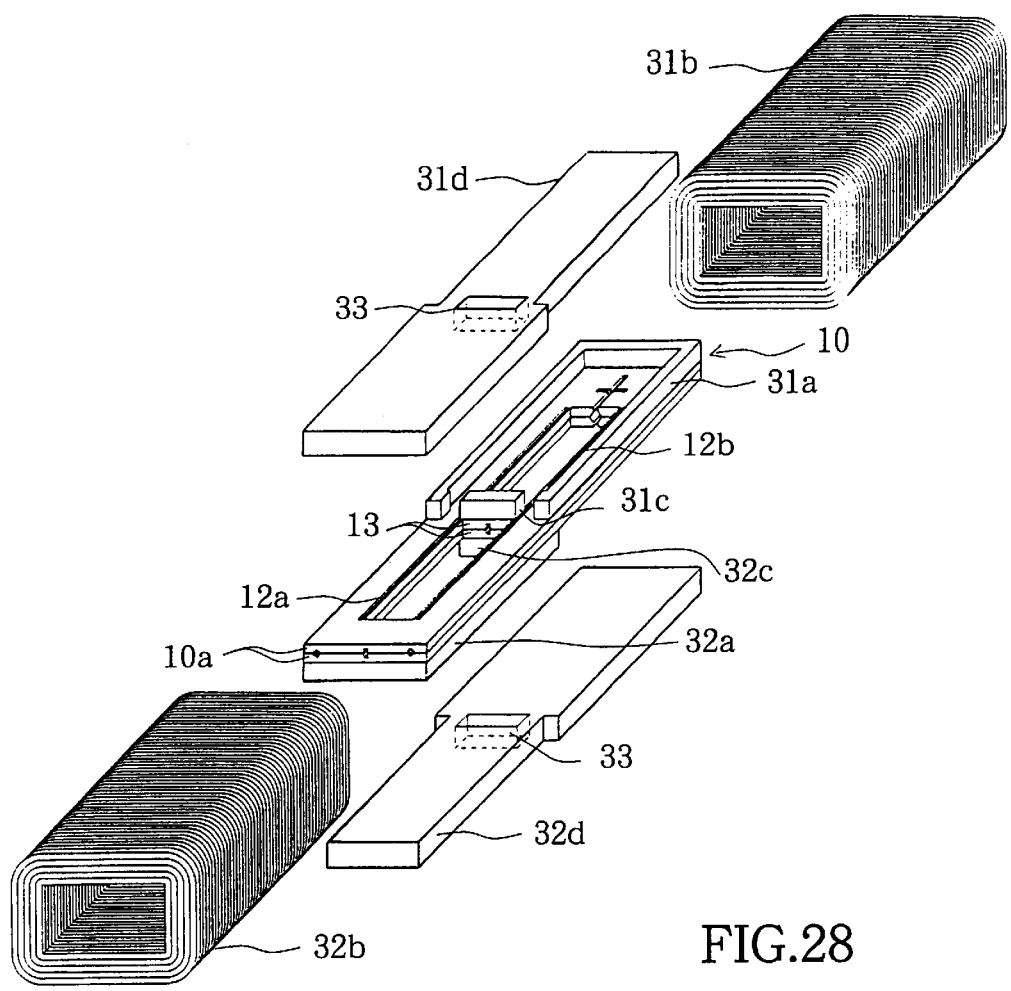
FIG. 28 is an enlarged exploded perspective view showing the configuration of the second embodiment.

FIG. 27 is an enlarged perspective view showing the configuration of a second embodiment of this invention, and FIG. 28 is an enlarged exploded perspective view of the same.

This second embodiment comprises a pair of fixed optical fibers 1a and 1b, a pair of movable optical fibers 2a and 2b, support member 10 for supporting the end portions of these fixed optical fibers and movable optical fibers, and drive mechanism 30 mounted on this support member and serving to produce a mechanical displacement of the end portions of the pair of movable optical fibers 2a and 2b.

As in the first embodiment, support member 10 is formed by sticking together two frames 10a. The pair of fixed optical fibers 1a and 1b and the pair of movable optical fibers 2a and 2b are fixed in the same manner as in the first embodiment.

Drive mechanism 30 comprises first electromagnetic means and second electromagnetic means. The first electromagnetic means comprises first core 31a, first coil 31b, first permanent magnet 31c fixed to linking portion 13 of upper frame 10a, and first covering plate 31d for covering the top of support member 10. Guiding groove 33 is formed in first covering plate 31d at a position corresponding to the gap between the two magnetic poles of first core 31a, and serves to regulate the direction of movement of first permanent magnet 31c.

The second electromagnetic means comprises second core 32a, second coil 32b, second permanent magnet 32c fixed to linking portion 13 of lower frame 10a, and second covering plate 32d for covering the bottom of support member 10. Guiding groove 33 is formed in second covering plate 32d at a position corresponding to the gap between the two magnetic poles of second core 32a, and serves to regulate the direction of movement of second permanent magnet 32c.

Figures 29, 30:
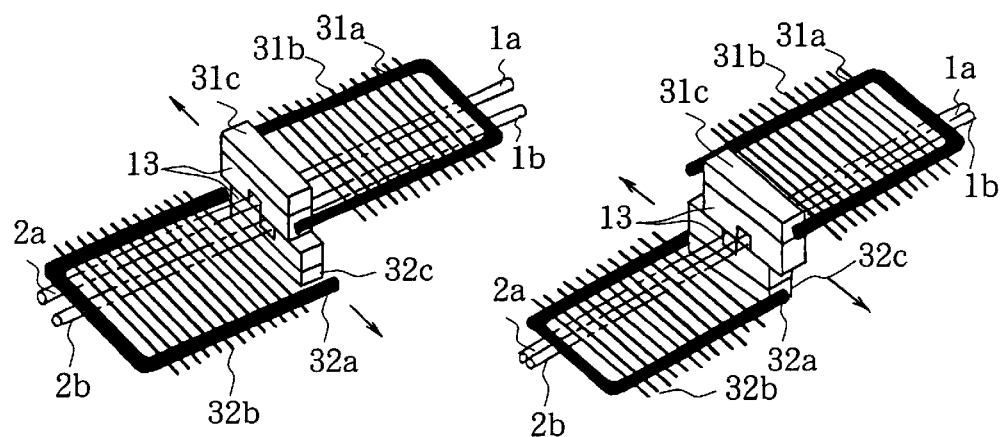
FIG. 29 and FIG. 30 serve to explain the switching action of the second embodiment.

FIG. 29 and FIG. 30 serve to explain the switching action of this second embodiment. As in the first embodiment, it is assumed that the left sides of first permanent magnet 31c and second permanent magnet 32c are north poles and that their right sides are south poles. If electric current is temporarily supplied to first coil 31b in such manner that the opposing magnetic poles of first core 31a both become south poles, first permanent magnet 31c experiences the attracting and repelling forces of the first electromagnetic means and moves to the left as shown in FIG. 29. This movement is accompanied by movable optical fiber 2a also moving to the left, whereupon the end face of movable optical fiber 2a and the end face of fixed optical fiber 1a are approximately aligned and an optical communication path is formed.

If, at the same time as this, current is temporarily supplied to second coil 32b in such manner that the opposing magnetic poles of second core 32a both become north poles, second permanent magnet 32c experiences the attracting and repelling forces of the second electromagnetic means and moves to the right as shown in FIG. 29. This movement is accompanied by movable optical fiber 2b moving to the right, whereupon the end face of movable optical fiber 2b and the end face of fixed optical fiber 1b are approximately aligned and an optical communication path is formed.

To switch the optical paths from this state, electric current is temporarily supplied to first coil 31b in such manner that the opposing magnetic poles of first core 31a both become north poles. As a result of supplying this current, first permanent magnet 31c experiences the attracting and repelling forces of the first electromagnetic means and moves to the right as shown in FIG. 30. This movement is accompanied by movable optical fiber 2a also moving to the right, whereupon the end face of movable optical fiber 2a and the end face of fixed optical fiber 1b are approximately aligned and an optical communication path is formed.

If electric current is temporarily supplied to second coil 32b at the same time as current is supplied to first coil 31b, in such manner that the opposing magnetic poles of second core 32a both become south poles, second permanent magnet 32c experiences the attracting and repelling forces of the second electromagnetic means and moves to the left as shown in FIG. 30. This movement is accompanied by movable optical fiber 2b also moving to the left, whereupon the end face of movable optical fiber 2b and the end face of fixed optical fiber 1a are approximately aligned and an optical communication path is formed.

Third Embodiment

Figure 31:
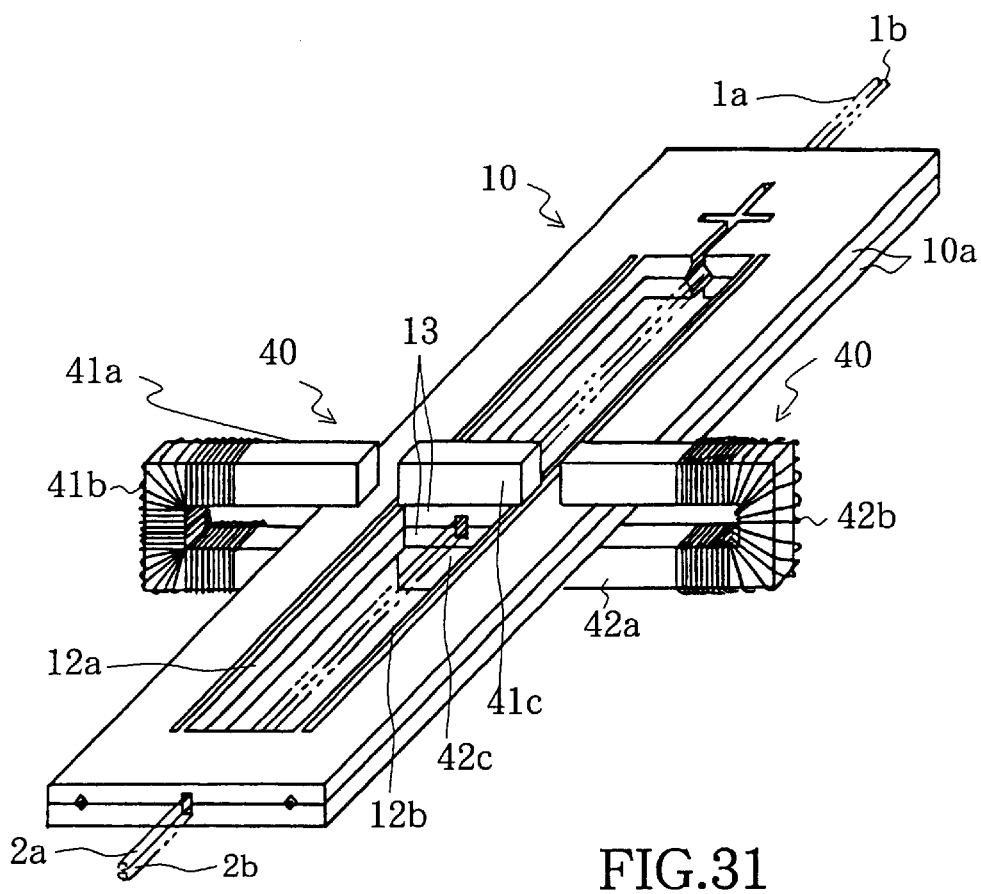
FIG. 31 is an enlarged perspective view showing the configuration of a third embodiment of this invention.

FIG. 31 is an enlarged perspective view showing the configuration of a third embodiment of this invention. This third embodiment comprises a pair of fixed optical fibers 1a and 1b, a pair of movable optical fibers 2a and 2b, support member 10 for supporting the end portions of these fixed optical fibers and movable optical fibers, and drive mechanism 40 mounted on this support member and serving to produce a mechanical displacement of the end portions of the pair of movable optical fibers 2a and 2b. As in the first embodiment, support member 10 is formed by sticking together two frames 10a. The pair of fixed optical fibers 1a and 1b and the pair of movable optical fibers 2a and 2b are fixed in the same manner as in the first embodiment.

Drive mechanism 40 comprises first electromagnetic means and second electromagnetic means. The first electromagnetic means comprises first core 41a, first coil 41b, and first permanent magnet 41c fixed to linking portion 13 of upper frame 10a. The second electromagnetic means comprises second core 42a, second coil 42b, and second permanent magnet 42c fixed to linking portion 13 of lower frame 10a.

Figure 32:
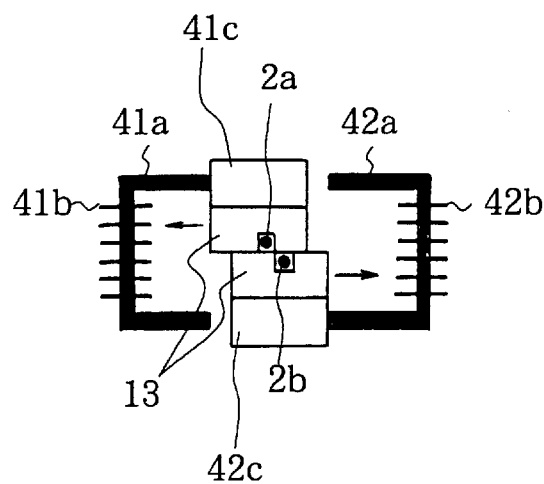
FIG. 32 and FIG. 33 serve to explain the switching action of the third embodiment.
Figure 33:
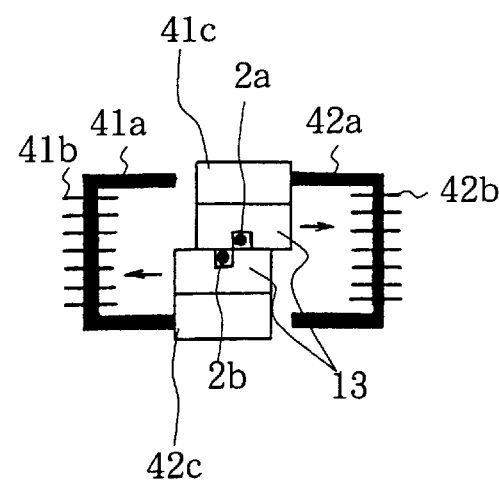

FIG. 32 and FIG. 33 serve to explain the switching action of this third embodiment. It is assumed that the left sides of first permanent magnet 41c and second permanent magnet 42c are north poles and that their right sides are south poles.

If electric current is temporarily supplied to first coil 41b and second coil 42b in such manner that the top magnetic poles of first core 41a and second core 42a both become south poles and their bottom magnetic poles both become north poles, first permanent magnet 41c is attracted by the first electromagnetic means and repelled by the second electromagnetic means, and moves to the left as shown in FIG. 32. This movement is accompanied by movable optical fiber 2a also moving to the left, whereupon the end face of movable optical fiber 2a and the end face of fixed optical fiber 1a are approximately aligned and an optical communication path is formed. Meanwhile, second permanent magnet 42c is repelled by the first electromagnetic means and attracted by the second electromagnetic means, and moves to the right as shown in FIG. 32. This movement is accompanied by movable optical fiber 2b moving to the right, whereupon the end face of movable optical fiber 2b and the end face of fixed optical fiber 1b are approximately aligned and an optical communication path is formed.

To switch the optical paths from this state, electric current is temporarily supplied to first coil 41b and second coil 42b in such manner that the top magnetic poles of first core 41a and second core 42a both become north poles, and their bottom magnetic poles both become south poles. As a result of supplying these currents, first permanent magnet 41c is repelled by the first electromagnetic means and attracted by the second electromagnetic means, and moves to the right as shown in FIG. 33. This movement is accompanied by movable optical fiber 2a also moving to the right, whereupon the end face of movable optical fiber 2a and the end face of fixed optical fiber 1b are approximately aligned and an optical communication path is formed. Meanwhile, second permanent magnet 42c is attracted by the first electromagnetic means and repelled by the second electromagnetic means, and moves to the left as shown in FIG. 33. This movement is accompanied by movable optical fiber 2b also moving to the left, whereupon the end face of movable optical fiber 2b and the end face of fixed optical fiber 1a are approximately aligned and an optical communication path is formed.

In this way it will be possible to mass produce, inexpensively and with high yield, a small 2◊2 optical switch with a construction giving low optical loss. Namely, the optical paths through the switch can be interchanged while ensuring that the ends of the two movable optical fibers always end up facing the ends of the two fixed optical fibers.

Fourth Embodiment

Figure 34:
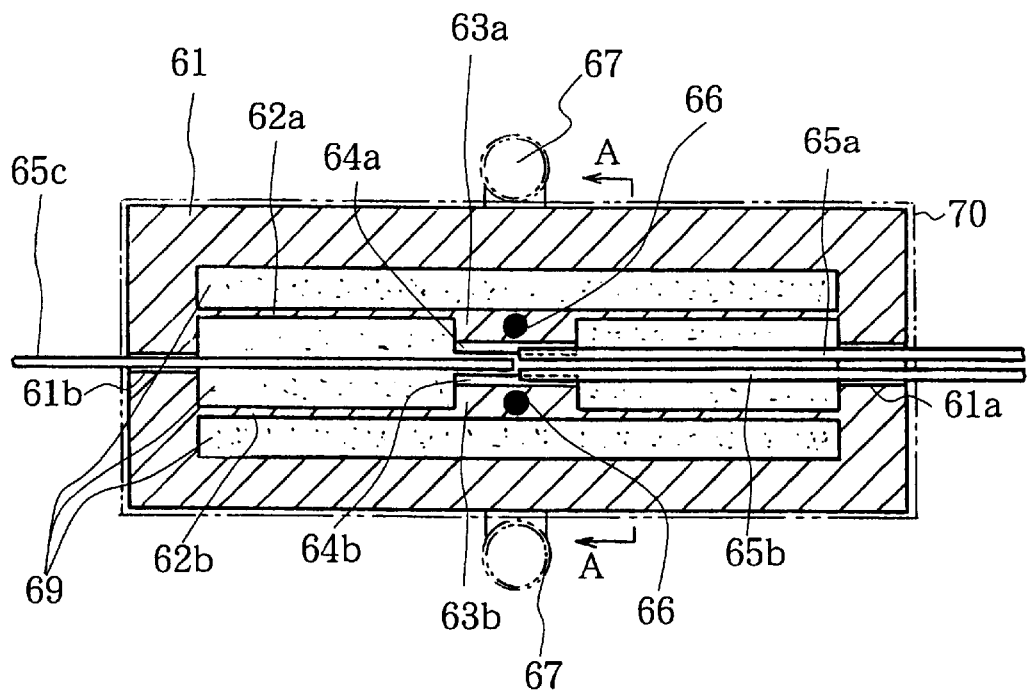
FIG. 34 is an enlarged sectional view showing the configuration of the main parts of a fourth embodiment of this invention.
Figure 35:
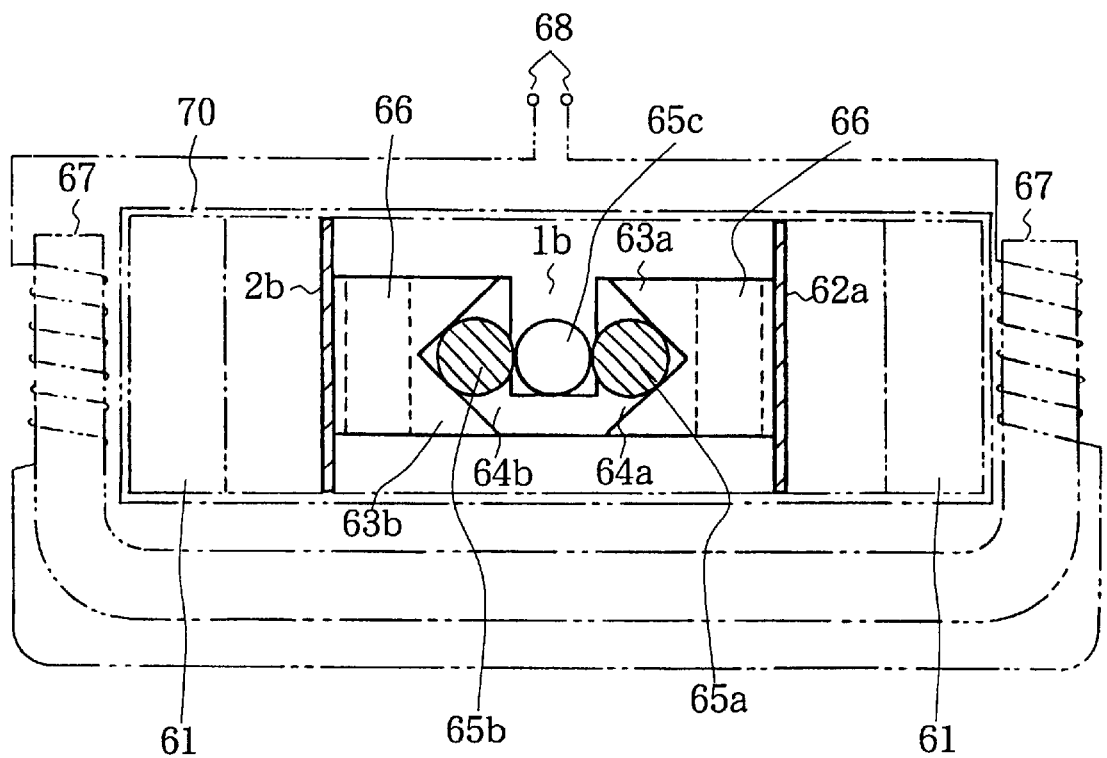
FIG. 35 is an enlarged sectional view in the direction of arrows A in FIG. 34, showing the arrangement of optical fibers in the fourth embodiment.

FIG. 34 is an enlarged sectional view showing the configuration of the main parts of a fourth embodiment of the present invention. FIG. 35 is an enlarged sectional view in the direction of arrows Ain FIG. 34, and showing the arrangement of the optical fibers in this fourth embodiment.

This fourth embodiment comprises a single frame 61, two parallel beams 62a and 62b provided on the inside of this frame, and a pair of projections 63a and 63b provided in mutually opposing manner in approximately the middle of the beams. V-grooves 64a and 64b are formed parallel to beams 62a and 62b in the opposing faces of projections 63a and 63b. A pair of optical fibers 65a and 65b are arranged in V-grooves 64a and 64b with their end portions in contact with respective V-grooves, and a single optical fiber 65c is arranged with its end opposing the ends of the pair of optical fibers 65a and 65b.

Frame 61 and beams 62a and 62b are a continuous body cut from a single silicon wafer, frame 61 is rectangular, and beams 62a and 62b are formed parallel to the long sides of this rectangle.

Magnetic members 66 are incorporated in projections 63a and 63b, and electromagnet 67 is provided outside frame 61, said electromagnet producing a displacement of beams 62a and 62b by applying magnetic force to these magnetic members 66. By reversing the polarity of the power source supplying terminals 68, electromagnet 67 is able to change the direction in which beams 62a and 62b are displaced.

An optical switch according to this fourth embodiment can be extremely small, with the length of a long side of frame 61 ranging from 5 to 25 mm. Frame 61 is filled with index-matching oil 69 to stabilize the movement of projections 63a and 63b, and is packaged in a sealed container.

Figure 36:
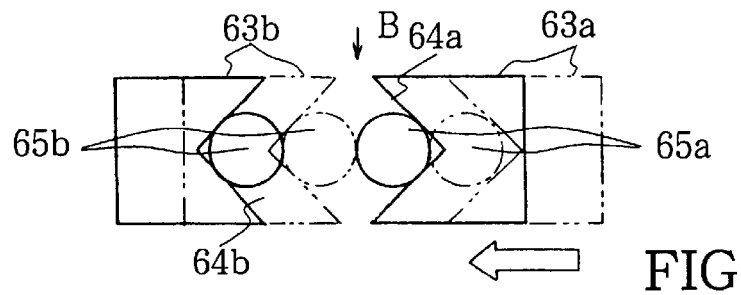
FIG. 36 and FIG. 37 are respectively a front view and a plan view serving to explain the optical coupling of optical fibers by switching to the left in the fourth embodiment.
Figure 37:
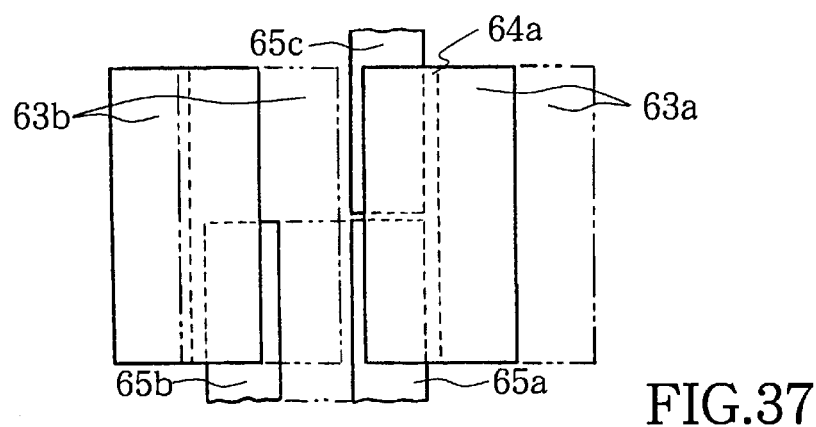

The working of this fourth embodiment thus configured will now be described. If power is supplied to terminals 68, magnetic force is produced by electromagnet 67, whereupon magnetic members 66 incorporated in projections 63a and 63b are pulled one way. FIG. 36 is a front view looking along the optical fiber cores and shows the situation when the projections have been pulled to the left. FIG. 37 is a plan view in the direction of arrow B in FIG. 36. As shown in FIG. 36 and FIG. 37, when optical fibers 65a and 65b are pulled to the left, projections 63a and 63b move from the position shown by the double-dot-and-dash lines to the position shown by the solid lines.

This movement is accompanied by the end faces of optical fibers 65a and 65b moving, these optical fibers having been arranged in contact with projections 63a and 63b. Optical fiber 65b moves away from optical fiber 65c, while the end of optical fiber 65a moves into alignment with the end of optical fiber 65c. This-results in optical fiber 65c being optically coupled to the optical path that includes optical fiber 65a. The end portion of optical fiber 65c is then accommodated in V-groove 64a formed in projection 63a, as shown in FIG. 37, and hence its stability is maintained.

Figure 38:
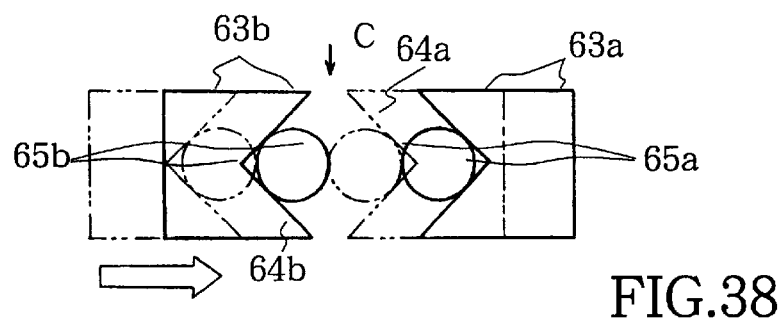
FIG. 38 and FIG. 39 are respectively a front view and a plan view serving to explain the optical coupling of optical fibers by switching to the right in the fourth embodiment.
Figure 39:
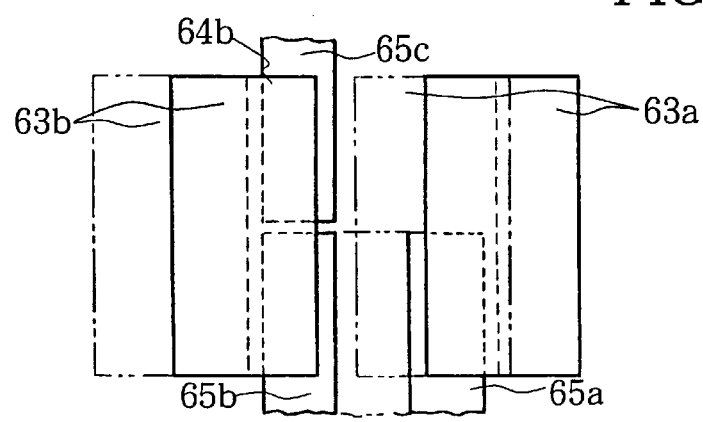

When the power supply is interrupted, optical fibers 65a and 65b are returned to the middle position shown in FIG. 35 by the elastic force of beams 62a and 62b. If the polarity of the power source supplying terminals 68 is reversed, magnetic members 66 are pulled in the opposite direction by electromagnet 67. FIG. 38 is a front view looking along the optical fiber cores and shows the situation when the projections have been pulled to the right. FIG. 39 is a plan view in the direction of arrow C in FIG. 38. As shown in FIG. 38 and FIG. 39, when they are pulled to the right, projections 63a and 63b move from the position shown by the double-dot-and-dash lines to the position shown by the solid lines.

This movement is accompanied by the end faces of optical fibers 65a and 65b also moving to the right, these optical fibers having been arranged in contact with projections 63a and 63b. Optical fiber 65a moves away from optical fiber 65c, while the end of optical fiber 65b moves into alignment with the end of optical fiber 65c. This results in optical fiber 65c being optically coupled to the optical path that includes optical fiber 65b. The end portion of optical fiber 65c is then accommodated in V-groove 64b formed in projection 63b, as shown in FIG. 39, and hence the stability of optical fibers 65b and 65c after the switching can be maintained.

When the power supply to terminals 68 is interrupted, optical fibers 65a and 65b are returned to the middle position shown in FIG. 35 by the elastic force of beams 62a and 62b.

Because the inside of frame 61 is filled with index-matching oil 69, vibration of projections 63a and 63b due to the switching is suppressed by the resistance of the index-matching oil.

Figure 40:
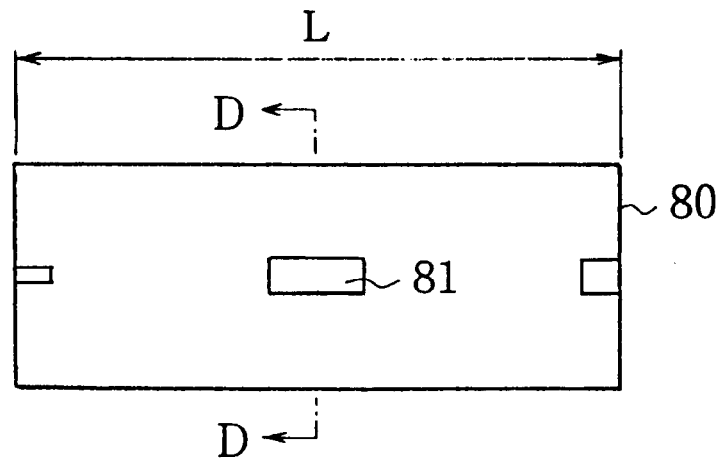
FIG. 40 to FIG. 42 serve to explain the steps involved in the fabrication of a frame used in the fourth embodiment.
Figure 41:
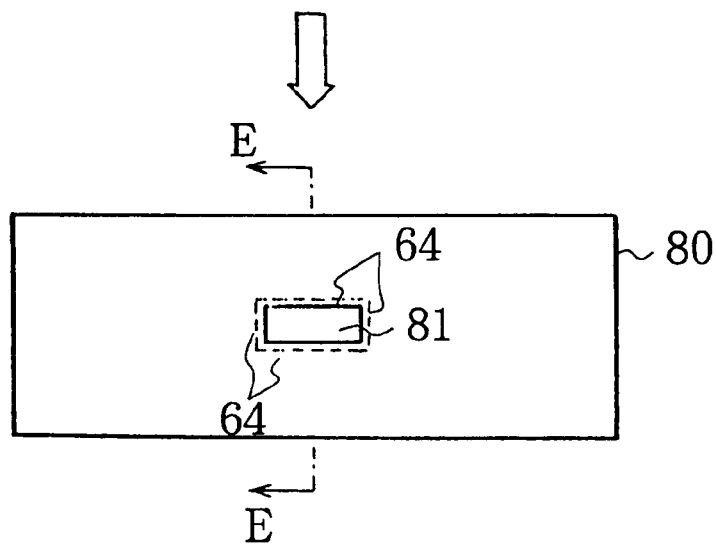
Figure 42:
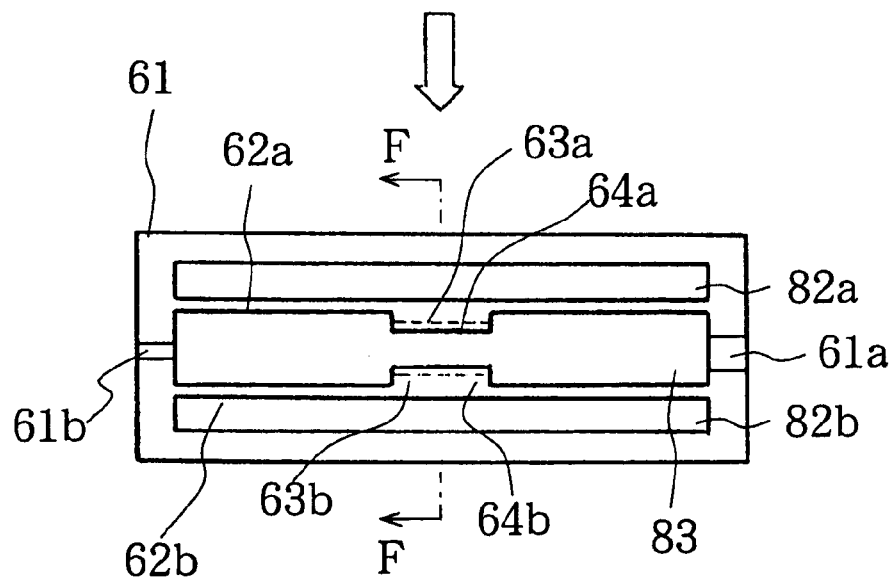
Figure 43:
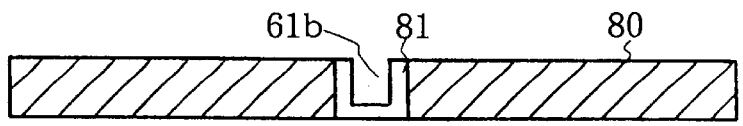
FIG. 43 to FIG. 48 serve to explain the steps involved in the fabrication of an optical switch used in the fourth embodiment.
Figure 44:
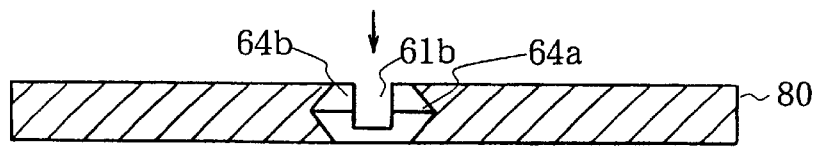
Figure 45:
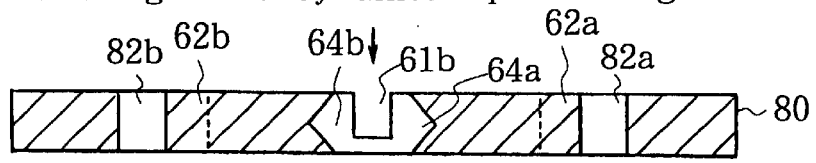
Figure 46:
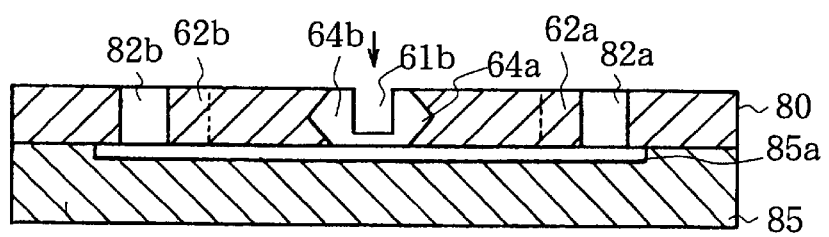
Figure 47:
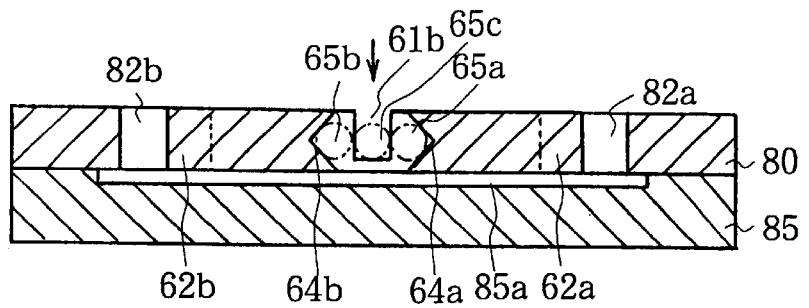
Figure 48:
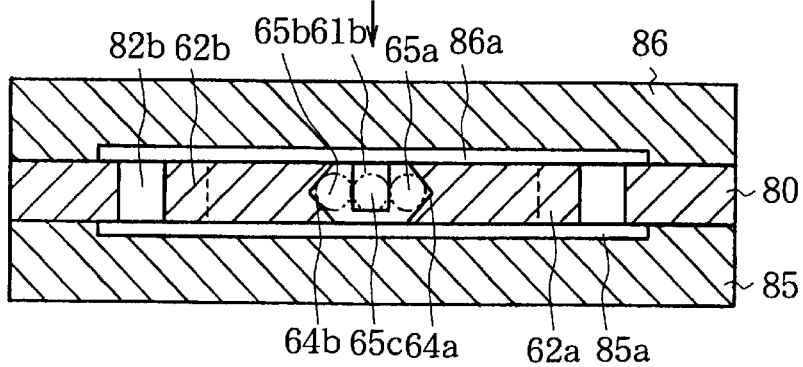

The method of fabricating the optical switch used in this fourth embodiment will now be described. FIG. 40, FIG. 41 and FIG. 42 serve to explain the steps involved in fabricating the frame used in the fourth embodiment, while FIG. 43 to FIG. 48 serve to explain the steps involved in fabricating the optical switch used in the fourth embodiment. FIG. 43, FIG. 44 and FIG. 45 are sectional views in the direction of arrows D, E and F respectively of the frame shown in FIG. 40, FIG. 41 and FIG. 42. FIG. 46, FIG. 47 and FIG. 48 are sectional views of the optical switch seen from the same direction.

Having obtained silicon wafer 80 with a longer side of length L=18 mm, reactive ion etching is employed to form through-hole 81 in the portion where projections 63a and 63b will oppose each other as shown in FIG. 34 and FIG. 35. This through-hole enables the V-grooves to be formed. The reactive ion etching also serves to form fixing groove 61a for zing optical fibers 65a and 65b in frame 61, and fixing groove 61b for fixing optical fiber 65c in frame 61. This fabrication step is illustrated in FIG. 40 and FIG. 43. The width of fixing groove 61a is set so that optical fibers 65a and 65b can be accommodated with a prescribed gap between them, while the width of fixing groove 61b is set so that optical fiber 65c can be accommodated. The etching of the fixing grooves is performed simultaneously with the fabrication of through-hole 81, and is continued until fixing grooves 61a and 61b reach a prescribed depth. After this depth has been reached, resist is applied to the fixing grooves to halt the progress of etching in the groove regions, and through-hole 81 continues to be made.

Next, as shown in FIG. 41 and FIG. 44, tetramethylammonium hydroxide (TMAH) is used for anisotropic etching on the inside of through-hole 81, thereby forming V-groove 64 all around the inside of the through-hole.

Figure 49:
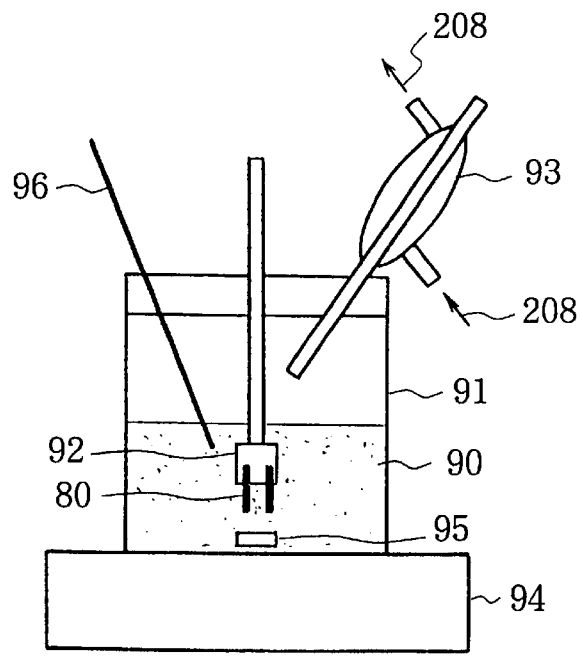
FIG. 49 shows the configuration of the main parts of the anisotropic etching system used to form the V-grooves in the fourth embodiment.

FIG. 49 shows the configuration of the main parts of the anisotropic etching system used. This system comprises processing vessel 91 in which the etching using aqueous TMAH solution 90 is performed, fixing jig 92 for supporting the material for processing (silicon wafer 80) in the aqueous TMAH solution, cooling tube 93 for circulating cooling water 208, heater 94 for heating the processing vessel, stirrer 95 for stirring the aqueous TMAH solution, and thermometer 96 for measuring the temperature of the aqueous TMAH solution.

Silicon wafer 80 on which V-groove 64 has been formed by this anisotropic etching is then subjected to reactive ion etching to form etched-through portions 82a, 82b and 83 as shown in FIG. 42 and FIG. 45. When etched-through portion 83 is formed, the left and right portions of V-groove 64 are removed as shown in FIG. 42. These fabrication steps result in frame 61, which includes beams 62a and 62b, projections 63a and 63b, and V-grooves 64a and 64b, being formed integrally from a single piece of material for processing, i.e., from single silicon wafer 80.

Figure 50:
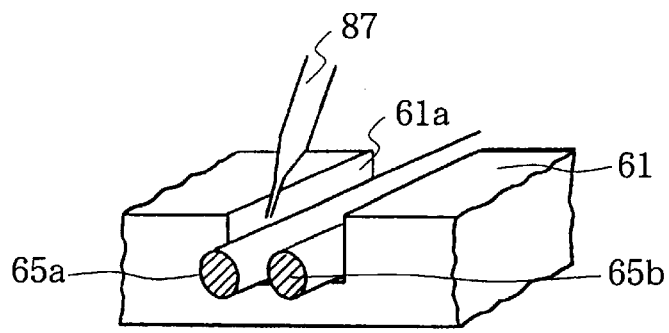
FIG. 50 and FIG. 51 serve to explain the method used for fixing optical fibers to a frame in the fourth embodiment.
Figure 51:
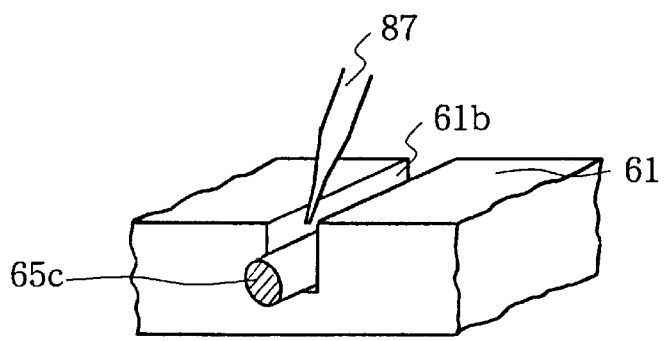

Next, as shown in FIG. 46, glass base 85 is joined to the bottom of frame 61, this glass base being provided with indentation 85a corresponding to the position of projections 63a and 63b. A pair of optical fibers 65a and 65b are then inserted through fixing groove 61a so that, as shown in FIG. 47, their end portions are positioned in contact with V-grooves 64a and 64b. These fibers are then fixed in fixing groove 61a by injecting adhesive using micro-pipette 87 as shown in FIG. 50. Optical fiber 65c is similarly fixed in fixing groove 61b, as illustrated in FIG. 51. After optical fibers 65a, 65b and 65c have thus been fixed, glass cover 86 is joined to the top of frame 61 as shown in FIG. 48, this glass cover being provided with indentation 86a in a position corresponding to projections 63a and 63b.

As post-processing, magnetic members 66 are fixed in projections 63a and 63b, and electromagnet 67 is arranged outside frame 61. Mounting holes are prepared in advance in projections 63a and 63b during the etching, and the magnetic members are fixed by being press-fitted into these mounting holes.

Figure 52:
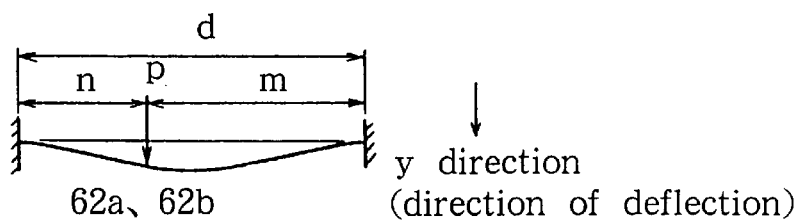
FIG. 52 shows a load position for calculating the amount of deflection of the beams in the fourth embodiment.
Figure 53:
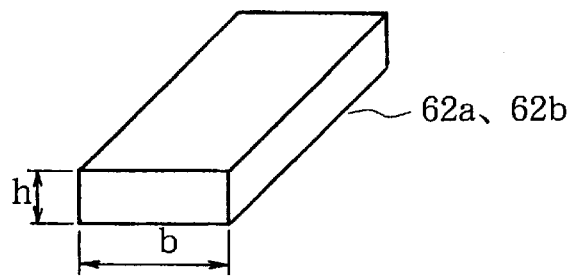
FIG. 53 shows the shape of the beams in the fourth embodiment.

FIG. 52 shows the position of a load for calculating the amount of deflection of the beams in this fourth embodiment, and FIG. 53 shows the shape of a beam.

The relation between $y_{max}$, the maximum deflection of a beam, and the load P that gives this maximum deflection, is given by:

$$y_{max} = \frac{2Pn^3m^2}{3(3n+m)^2 EI} \quad (1)$$

where I is the geometrical moment of inertia of the beam ($bh^3/12$), and E is Young's modulus.

When load P is applied in the middle of the beam:

$$n=m=d/2 \quad (2)$$

in which case:

$$y_{max} = \frac{Pd^3}{192EI} \quad (3)$$

The results of experiments on specimens fabricated in accordance with the method outlined above will now be described.

A 22% aqueous TMAH solution 90 was put in processing vessel 91 shown in FIG. 49 and the solution temperature maintained at 80° C. by cooling tube 93 and heater 94 while stirring with stirrer 95. The etching rate was set at approximately 0.5 μm/min, and the material to be processed (i.e., silicon wafer 80) was etched while being supported by fixing jig 92. The beam structure was fabricated by reactive ion etching, with Samples 1 and 2 indicated in Table 1 being fabricated.

TABLE 1

|   | Sample 1 | Sample 2 |
|---|----------|----------|
| b | 300 μm   | 300 μm   |
| h | 85 μm    | 85 μm    |
| d | 15,000 μm | 13,400 μm |

The maximum deflection $y_{max}$ of Samples 1 and 2 when the load was applied to the middle of the beams was set to the values given in Table 2.

TABLE 2

|   | Sample 1 | Sample 2 |
|---|----------|----------|
| $y_{max}$, | 150 μm | 100 μm |

The force P required to move the beams by the maximum deflection $y_{max}$, and hence the force required for switching, was calculated using Equation 3, giving the values indicated in Table 3.

TABLE 3

|    | Sample 1 | Sample 2 |
|----|----------|----------|
| P  | 0.017N   | 0.016N   |
| 2P | 0.034N   | 0.032N   |

P: force needed to move one beam
2P: force needed to move two beams
N: newtons

The Young's modulus of the silicon wafer was taken as:

$$E=1.30\times10^{11}(Nm^2)$$

Figure 54:
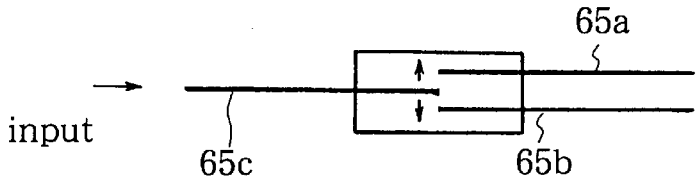
FIG. 54 shows the directions in which the optical fibers switch in an optical switch according to the fourth embodiment.
Figure 55:
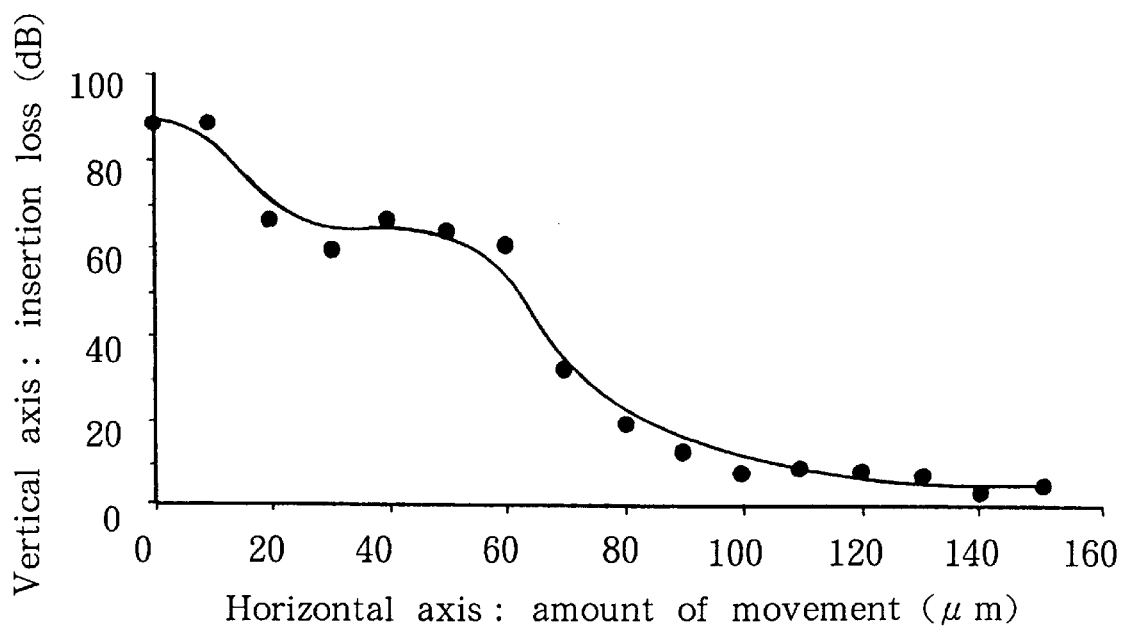
FIG. 55 gives experimental data on insertion loss as a function of the amount of movement of the movable optical fiber in an optical switch according to the fourth embodiment.

Next, an optical switch was fabricated using Sample 1 and measurements made of insertion loss (dB) as a function of amount of movement (μm) when optical fiber 65a was made to move towards optical fiber 65c (see FIG. 54). The results of these measurements are given in FIG. 55.

These results show that as optical fiber 65a moved, insertion loss changed from approximately 90 dB (i.e., practically no coupling) to approximately 5 dB when the movement distance reached the 150 μm that had been set as the test condition. In other words, it was demonstrated that Sample 1 exhibits action that would enable it to be utilized as an optical switch.

Figure 56:
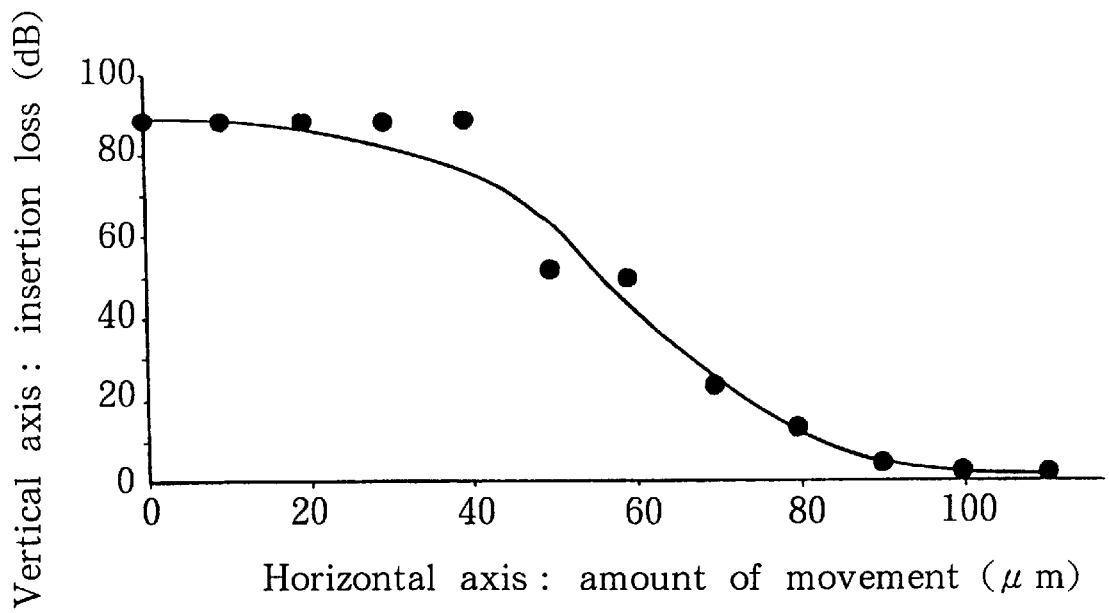
FIG. 56 and FIG. 57 give experimental data, obtained using other samples of the optical switch according to the fourth embodiment, on insertion loss as a function of the amount of movement of the movable optical fiber.

An optical switch was also fabricated using Sample 2 and measurements made of insertion loss (dB) as a function of amount of movement (μm) when optical fibers 65a and 65b shown in FIG. 54 were separately made to move towards optical fiber 65c. The results of these measurements are given in FIG. 56 and FIG. 57. FIG. 56, which gives the measured data obtained when optical fiber 65a was moved towards optical fiber 65c, shows that as optical fiber 65a moved, insertion loss changed from 95 dB (i.e., no coupling of optical energy) to approximately 0 dB when the movement distance reached the 100 μm that had been set as the test condition. In other words, measurements showed that almost all the light input to optical fiber 65c is transmitted to optical fiber 65a. This performance is fully adequate for the purpose of optical switching.

Figure 57:
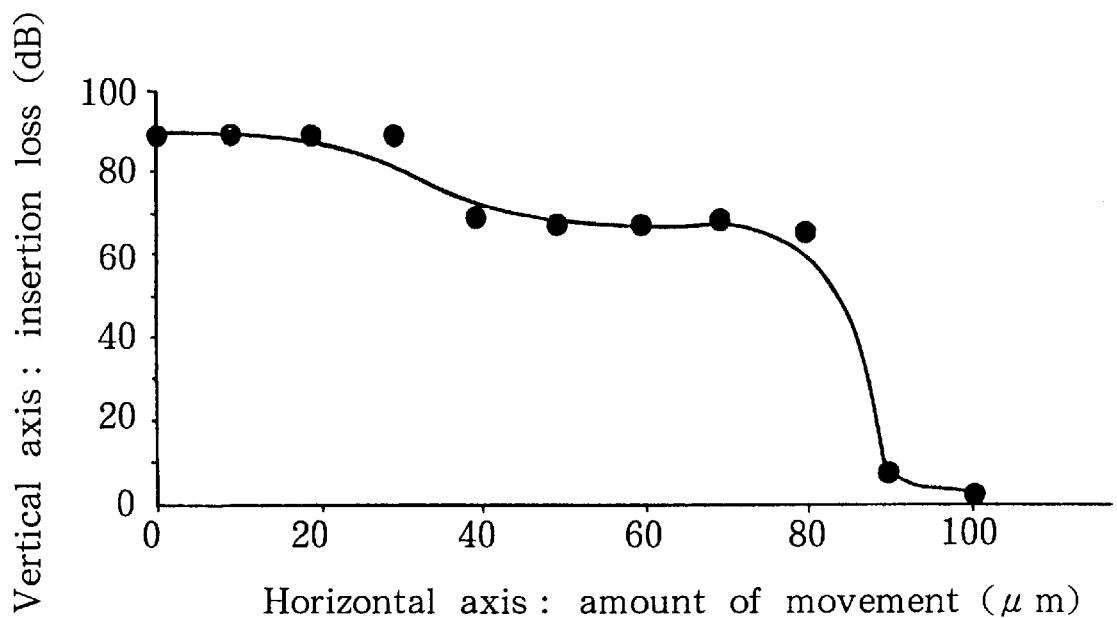

According to FIG. 57, which gives the measured data obtained when optical fiber 65b was moved towards optical fiber 65c, insertion loss changed from 95 dB (i.e., no coupling of optical energy) to approximately 5 dB when the movement distance reached 90 μm, and exhibited a value close to 0 dB when the movement distance reached the 100 μm set as the test condition. However, for some reason a slight leakage (or reflection) was observed until the amount of movement of optical fiber 65b exceeded 80 μm. Nevertheless, it has been demonstrated that Sample 2 can be utilized as a switch.

Fifth Embodiment

Figure 58:
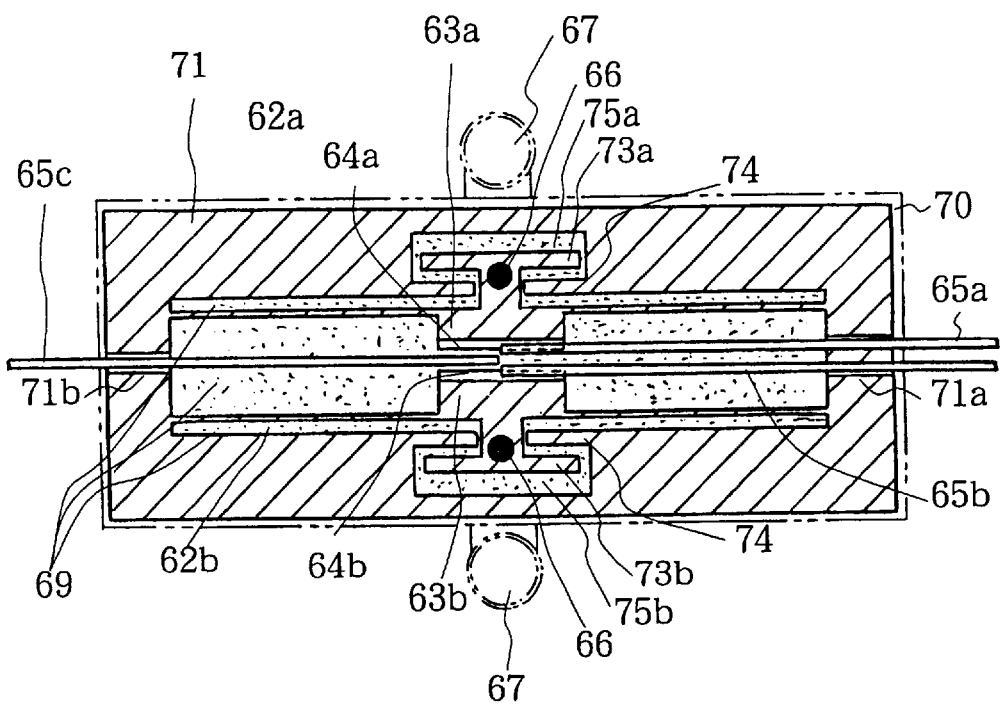
FIG. 58 is an enlarged sectional view showing the configuration of the main parts of a fifth embodiment of this invention.

FIG. 58 is an enlarged sectional view showing the configuration of the main parts of a fifth embodiment of this invention.

In this fifth embodiment, a stopper mechanism for restricting the range over which the pair of projections 63a and 63b can move is provided behind the opposing faces of the projections. This stopper mechanism comprises movable protrusions 73a and 73b formed as a continuation of projections 63a and 63b, and movable protrusion accommodating grooves 75a and 75b each having stopping walls 74 for restricting the amount of movement of projections 63a and 63b by having the movable protrusions 73a and 73b come into contact with the stopping walls. Movable protrusion accommodating grooves 75a and 75b are formed on the inside of frame 71. Apart from these movable protrusions and their accommodating grooves, this fifth embodiment is configured as the fourth embodiment. An optical switch according to this fifth embodiment thus configured is integrally fabricated from a single silicon wafer in similar manner to the fourth embodiment.

In this fifth embodiment, when projections 63a and 63b are displaced, the end portion of optical fiber 65a or optical fiber 65b is restrained from moving beyond the position at which it coincides with the end of optical fiber 65c. An advantage of this arrangement is that the amount of deformation undergone by beams 62a and 62b is kept to a minimum.

Optical fibers 65a and 65b are switched in the same manner as in the fourth embodiment.

Sixth Embodiment

Figure 59:
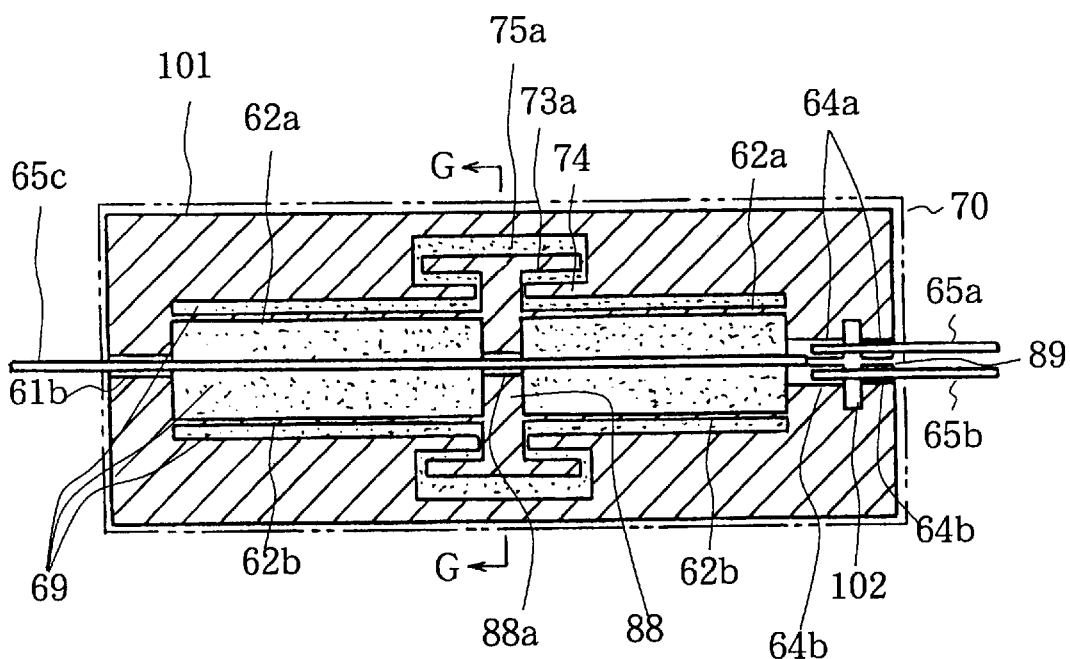
FIG. 59 is an enlarged sectional view showing the configuration of the main parts of a sixth embodiment of this invention.
Figure 60:
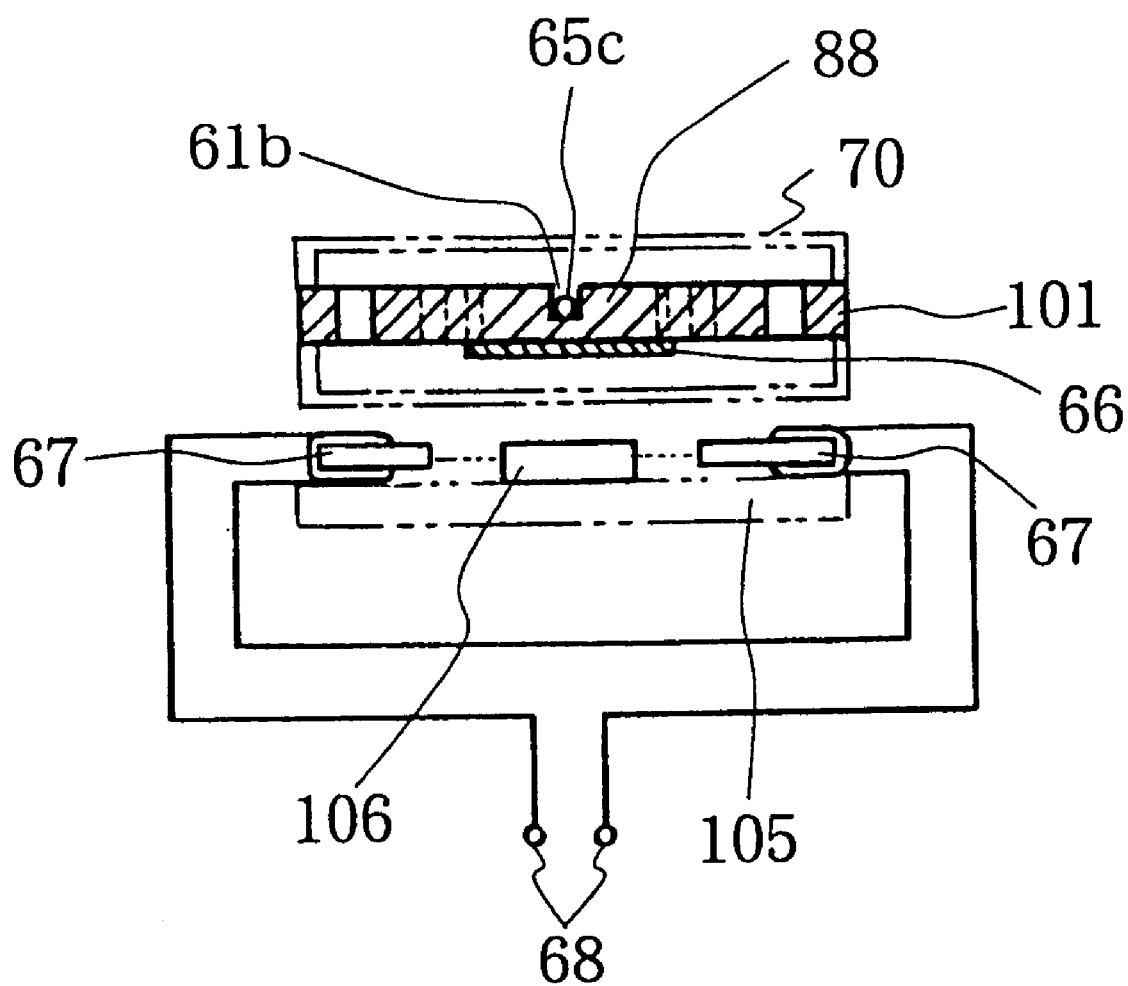
FIG. 60 is an enlarged sectional view in the direction of arrows G in FIG. 59, showing the configuration of the main parts of the sixth embodiment.
Figure 61:
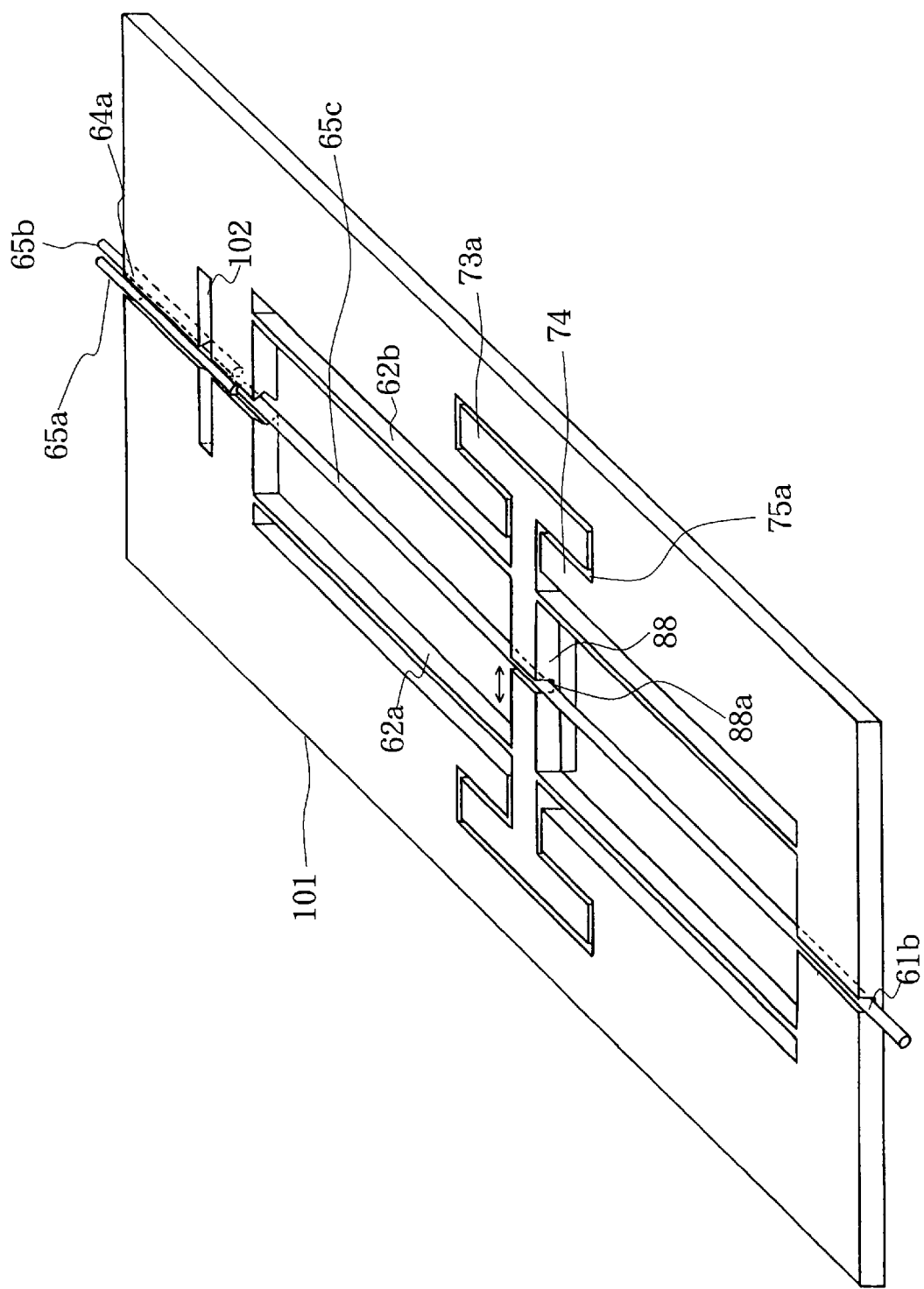
FIG. 61 is an enlarged perspective view showing the configuration of the frame in the sixth embodiment.

FIG. 59 to FIG. 62 variously illustrate a sixth embodiment of this invention. FIG. 59 and FIG. 60 are both enlarged sectional views showing the configuration of the main parts of this sixth embodiment, with FIG. 60 being a view in the direction of arrows G in FIG. 59. FIG. 61 is an enlarged perspective showing the configuration of the frame in this embodiment, while FIG. 62 is a lengthwise rear view of this frame.

This sixth embodiment of the invention comprises single frame 101, two parallel beams 62a and 62b provided on the inside of the frame, linking portion 88 interlinking the approximately middle portions of the two beams, and single optical fiber 65c supported at one end of the frame and at the linking portion, and arranged parallel to the beams so that its end portion reaches the other end of the frame. A pair of V-grooves 64a and 64b are formed at this other end of the frame at a position contiguous with the end portion of optical fiber 65c, in such manner that their opening portions 89 are opposed and the grooves run parallel to beams 62a and 62b. A pair of optical fibers 65a and 65b are arranged with their end portions in contact with the respective bottom portions of V-grooves 64a and 64b. Depending on the displacement of optical fiber 65c, one or other of the ends of this pair of optical fibers faces the single optical fiber.

Frame 101 and beams 62a and 62b are a continuous body cut from a single silicon wafer, the frame is rectangular, and the beams are formed parallel to the longer side of this rectangle.

Optical fibers 65a and 65b are fixed by application of adhesive to the portions of V-grooves 64a and 64b that are nearer the end of frame 101 than escape groove 102. Excess adhesive therefore flows into escape groove 102 and is prevented from flowing out towards optical fiber 65c. The end portions of optical fibers 65a and 65b and the end portion of optical fiber 65c are arranged so that they are opposed in the portion of V-grooves 64a and 64b that is nearer the middle of frame 101 than escape groove 102.

A stopper mechanism for restricting the range over which linking portion 88 can move is provided on the ends of the linking portion, and is configured is similar manner to the fifth embodiment.

The drive mechanism for driving linking portion 88 to the left and right is illustrated in FIG. 60 and FIG. 62. As these figures show, magnetic member 66 is fixed to the rear face of linking portion 88, and magnet 106 and electromagnet 67 are arranged opposing the rear face of this magnetic member 66. Magnet 106 is supported in sliding means 105.

In this sixth embodiment, if power is supplied to terminals 68, magnetic force is produced by electromagnet 67, whereupon magnet 106 is pulled in one direction along a guide groove (not illustrated) provided in sliding means 105. Because electromagnet 67 and magnetic member 66 fixed to the rear face of linking portion 88 are in an attracting state, linking portion 88 moves along with magnet 106 and in the same direction. For example, as shown in FIG. 63, if magnet 106 moves to the right, linking portion 88 also moves to the right. This movement is accompanied by optical fiber 65c also moving to the right, whereupon the end of optical fiber 65c and the end of optical fiber 65a are opposed and an optical path is formed. If magnet 106 moves to the left as shown in FIG. 64, linking portion 88 moves to the left. This movement is accompanied by optical fiber 65c also moving to the left, whereupon the end of optical fiber 65c and the end of optical fiber 65b are opposed and an optical path is formed.

Use of this drive mechanism ensures that once magnet 106 has moved to either the left or the right, it is held in the position to which it has moved even if the power supplied from terminals 68 is interrupted. Consequently, after the optical fiber has been switched, its switched state can be maintained without having to keep supplying power to terminals 68.

The method for fabricating an optical switch according to this sixth embodiment is nearly the same as the method for fabricating an optical switch according to the fourth embodiment. First of all, reactive ion etching is employed at one end of frame 101 to form a through-hole for the provision of the V-grooves and to provide fixing groove 88a in linking portion 88 and fixing groove 61b at the other end of the frame. Escape groove 102 is also formed by reactive ion etching. V-grooves 64a and 64b are formed in the through-hole portion by anisotropic etching. Next, in similar manner to the fourth embodiment, reactive ion etching is employed to cut out frame 101, which includes beams 62a and 62b and linking portion 88, which in turn includes movable protrusions 73a and 73b. Optical fibers 65a and 65b are inserted and fixed in V-grooves 64a and 64b, and single movable optical fiber 65c is fixed in fixing groove 88a of linking portion 88 and in fixing groove 61b. Fabrication of the optical switch is completed by bonding covers to this frame.

Figure 65:
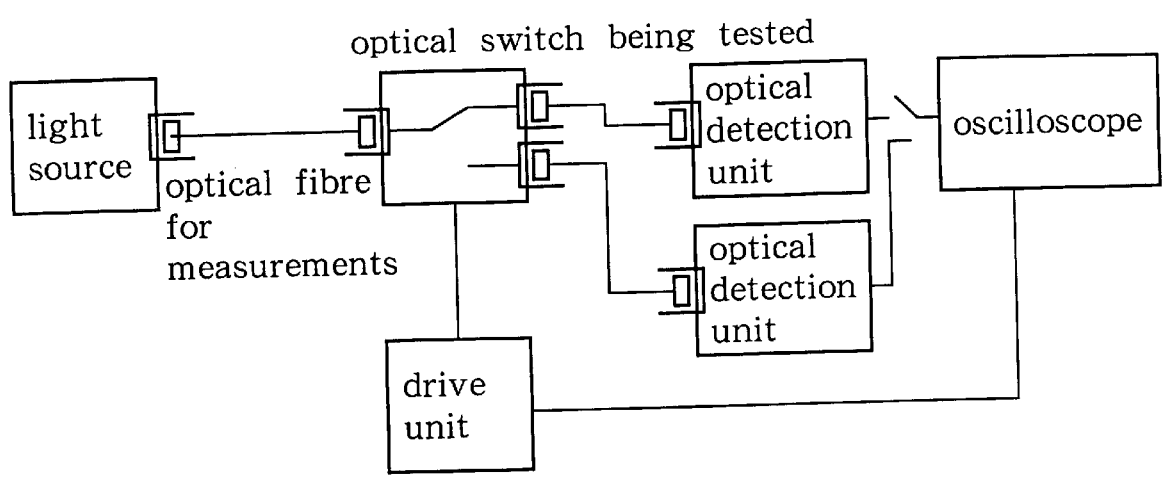
FIG. 65 shows the system employed to measure the switch characteristics of an optical switch.

The results of measurements of switching time when an optical switch fabricated according to this sixth embodiment was driven will now be given. The switching characteristics of the optical switch were measured using a measurement system configured as shown in FIG. 65. A switching time of 100 ms and an insertion loss of 1.2 dB were obtained at a drive voltage of 8 V dc and a drive current of 160 mA.

Seventh Embodiment

Figure 66:
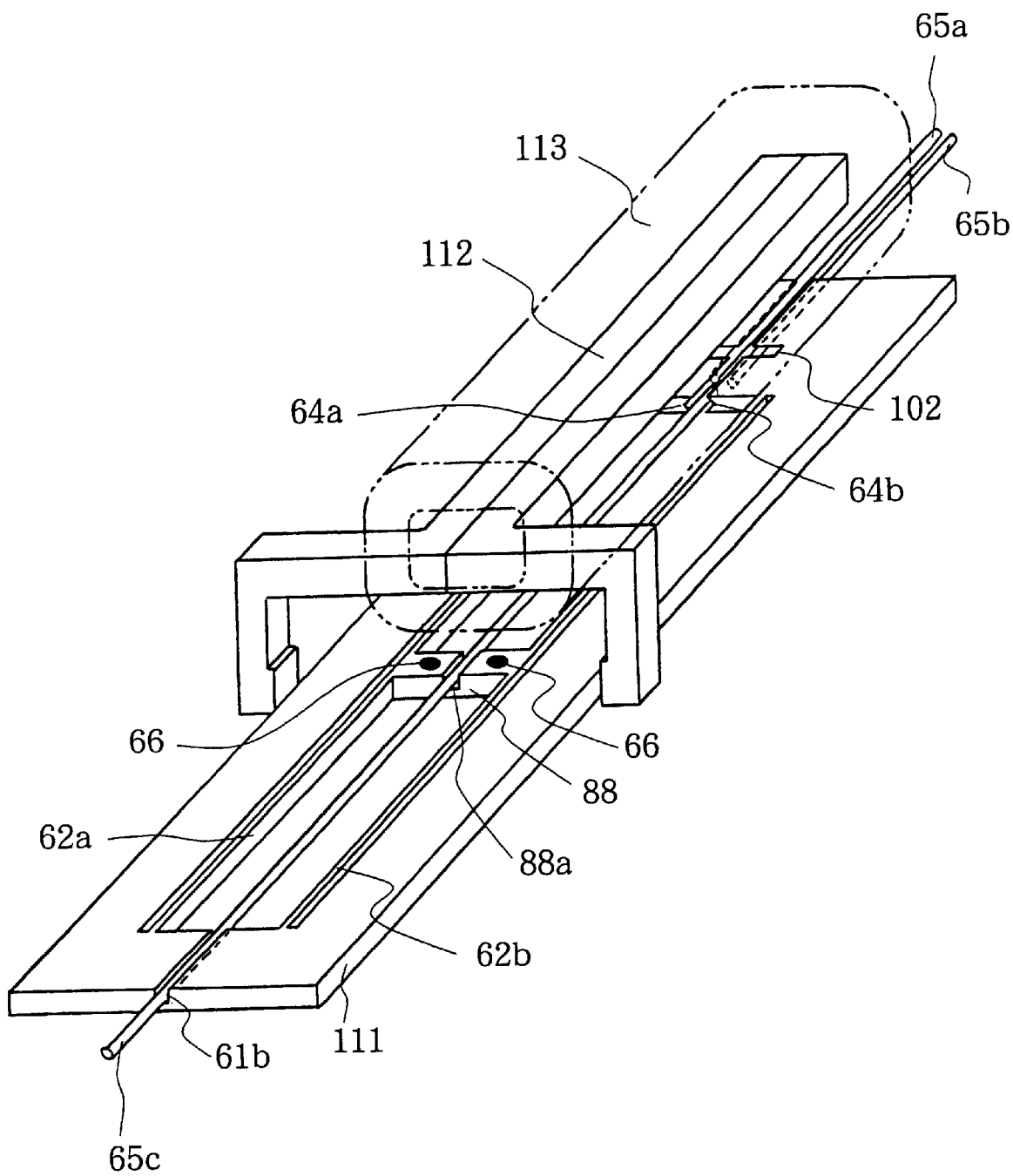
FIG. 66 is an enlarged perspective view showing the configuration of the main parts of a seventh embodiment of this invention.
Figure 67:
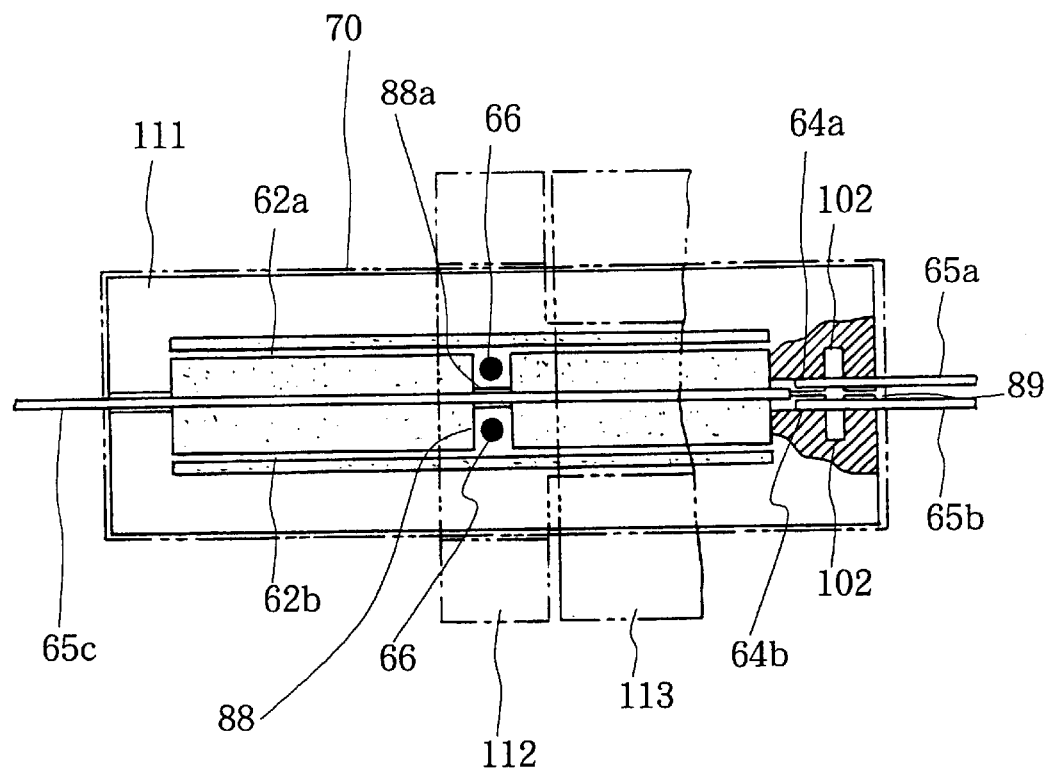
FIG. 67 is a partially sectional enlarged plan view showing the configuration of the main parts of the seventh embodiment.

FIG. 66 is an enlarged perspective view showing the configuration of the main parts of a seventh embodiment of this invention. FIG. 67 is a partially sectional enlarged plan view of the same.

This seventh embodiment comprises frame 111, two parallel beams 62a and 62b provided on the inside of the frame, linking portion 88 interlinking the approximately middle portions of the two beams, and a single optical fiber 65c supported at one end of the frame and at the linking portion, and arranged parallel to the beams so that its end portion reaches the other end of the frame.

A pair of V-grooves 64a and 64b are formed at this other end of the frame at a position contiguous with the sides of the end portion of optical fiber 65c, in such manner that their opening portions 89 are opposed and the grooves run parallel to beams 62a and 62b. A pair of optical fibers 65a and 65b are arranged with their end portions in contact with the respective bottom portions of V-grooves 64a and 64b. Depending on the displacement of optical fiber 65c, one or other of the ends of this pair of optical fibers faces the single optical fiber.

Frame 111 and beams 62a and 62b are a continuous body cut from a single silicon wafer in the same manner as the fourth embodiment. Frame 111 is rectangular and beams 62a and 62b are formed parallel to the longer side of this rectangle.

Optical fibers 65a and 65b are fixed by application of adhesive to the portions of V-grooves 64a and 64b that are nearer the end of frame 111 than escape groove 102. Excess adhesive therefore flows into escape groove 102 and is prevented from flowing out towards optical fiber 65c. The end portions of optical fibers 65a and 65b and the end portion of optical fiber 65c are arranged so that they are opposed in the portion of V-grooves 64a and 64b that is nearer the middle of frame 111 than escape groove 102.

The drive mechanism for driving linking portion 88 to the left and right comprises magnetic members 66, which are permanent magnets, incorporated in linking portion 88 so that there is one such magnetic member on each side of fixing groove 88a, and an electromagnetic means for exerting magnetic force on these magnetic members and thereby displacing beams 62a and 62b. This electromagnetic means comprises core 112 and coil 113 for causing this core to exert magnetic force.

In this seventh embodiment, if power is supplied to coil 113, a magnetic pole of one type is formed at the end of core 112 and this pulls the side of magnetic member 66 with the opposite pole in one direction. The magnetic members have fixed poles and are incorporated in linking portion 88. This movement is therefore accompanied by beams 62a and 62b moving and causes optical fiber 65c to move in one direction. The movement of optical fiber 65c results in its end face being aligned with the end face of optical fiber 65a or 65b, and in the formation of a communication path. Switching can be performed in similar manner to the fourth embodiment by changing the polarity of the power source supplying coil 113. An advantage of this seventh embodiment is that switching can be performed by changing the direction of the current in a single coil, thereby enabling the drive mechanism to be made smaller.

Figure 68:
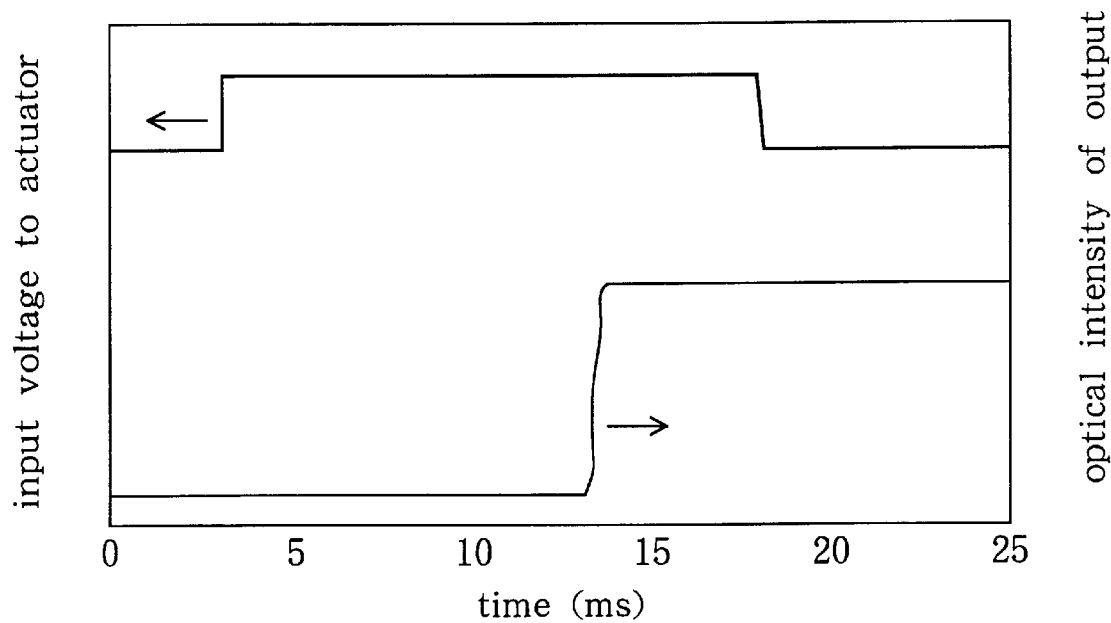
FIG. 68 gives results of measurements of switching characteristics of the seventh embodiment.

When the measurement system illustrated in FIG. 65 was used to measure the characteristics of an optical switch configured according to the seventh embodiment, it was found that a voltage of 5 V dc was required to drive the switch, and that at this voltage the current flow time was 15 ms and the switching time less than 10 ms. Power consumption was 4.8 W and insertion loss was 1.2 dB. A graphic representation of this switching is given in FIG. 68. The upper line in the graph shows the change in the voltage applied to the actuator, and it will be seen that a 15 ms square wave was input. The lower line shows the intensity of the light output from the end face of one of the two output optical fibers.

Because this invention enables some of the members that comprise an optical switch to be formed integrally from a single piece of material, it greatly simplifies the assembly of such a switch. It can therefore implement an extremely small optical switch, manufacture of which has previously been impossible due to the assembly operations required. This invention will also enable a highly reliable product, and one without variability in quality due to manual operations, to be mass-produced. It also makes skillful use of the mechanical elasticity that is an inherent property of a silicon wafer.

What is claimed is:

1. An optical switch comprising:

a pair of fixed optical fibers, a pair of movable optical fibers, a support member for supporting the end portions of the fixed optical fibers and said movable optical fibers, and a drive mechanism mounted on said support member and producing a mechanical displacement of the end portions of the pair of movable optical fibers;

said drive mechanism including means for producing displacement between a first position in which optical axes of the end portions of the pair of movable optical fibers are respectively aligned with optical axes of end portions of the fixed optical fibers, and a second position in which the optical axes of the end portions of the pair of movable optical fibers are respectively aligned, in the reverse order to that of the first position, with the optical axes of the end portions of the fixed optical fibers; wherein said support member comprises a single frame formed by two thin sheets stuck together;

each sheet comprises two parallel beams provided on the inside and a linking portion provided in approximately the middle of the beams and serving to interlink the beams;

each of said movable optical fibers is supported at one end of the frame and at the respective linking portion, and arranged parallel to the beams and so that its end portion reaches the other end of the frame;

a pair of V-grooves are formed at this other end of the frame at a position contiguous with the end portions of the movable optical fibers, in such manner that their opening portions are opposed, the grooves run parallel to the beams and said fixed optical fibers are arranged with their end portions in contact with the respective V-grooves; and the drive mechanism includes electromagnetic means for causing the end portions of the pair of movable optical fibers to come into contact with respective walls of the pair of V-grooves so that, depending on the displacements of said movable optical fibers, each end of said fixed optical fibers faces one or other of the ends of said movable optical fibers.

2. An optical switch as claimed in claim 1, wherein the pair of V-grooves appear at a face where the two thin sheets are stuck together.

3. An optical switch as claimed in claim 2, wherein the pair of V-grooves are part of an opening at face where the two thin sheets are stuck together, and said opening has an hexagonal cross-section.

4. An optical switch as claimed in claim 3, wherein the two thin sheets are silicon sheets and the grooves are formed by etching.

5. An optical switch as claimed in claim 1, wherein the electromagnetic means includes means for causing the ends of the pair of movable optical fibers to move in mutually different directions towards the walls of the V-grooves within a plane approximately perpendicular to the axes of the optical fibers.

6. An optical switch comprising a single frame, two parallel beams provided on the inside of this frame, a linking portion provided in approximately the middle of the beams and serving to interlink the beams, and a single optical fiber supported at one end of the frame and at the linking portion, and arranged parallel to the beams and so that its end portion reaches the other end of the frame; wherein a pair of V-grooves are formed at this other end of the frame at a position contiguous with the end portion of the single optical fiber, in such manner that their opening portions are opposed and the grooves run parallel to the beams; and a pair of optical fibers are arranged with their end portions in contact with the respective V-grooves and so that, depending on the displacement of the aforementioned single optical fiber, one or other of the ends of this pair of optical fibers faces the end of the single optical fiber.

7. An optical switch as claimed in claim 6, wherein the frame and the two beams are a continuous body cut from a single silicon wafer.

8. An optical switch as claimed in claim 7, wherein the frame is rectangular, and the beams are formed parallel to the long sides of this rectangle.

9. An optical switch as claimed in claim 8, wherein magnetic members are incorporated in the linking portion and a magnet is provided outside the frame, said magnet causing the beams to bend by applying magnetic force to these magnetic members.

10. An optical switch as claimed in claim 9, wherein the magnet is an electromagnet, an end of its core bifurcates, and the two magnetic poles of the magnetic members lie between the bifurcations.

11. An optical switch as claimed in claim 8, wherein the length of the longer side of the frame is from 5 to 25 mm.

12. An optical switch as claimed in claim 8, wherein the frame is packaged in a sealed container that is filled with index-matching oil.

13. A method for fabricating an optical switch, comprising: making a through-hole in a single silicon wafer by means of reactive ion etching from the front surface of the wafer; anisotropically etching the sides of this through-hole to form V-grooves with opposing openings at their ends; employing reactive ion etching to integrally cut out a component comprising a single frame, two parallel beams formed continuously with this frame on its inside, and a linking portion formed in the middle portion of these beams and lining them, said linking portion having a groove for accommodating a single optical fiber; joining the bottom face of this component to a base on which an indentation has been provided in the vicinity of the structure constituting the drive portion; fixing two optical fibers in the V-grooves with their end portions in contact with the bottoms of the respective grooves; inserting a single movable optical fiber in the groove on the linking portion; and joining the top face of this component to a cover on which an indentation has been provided in the vicinity of the structure constituting the drive portion.

* * * * *